[12] United States Patent
Yang

(10) Patent No.: US 11,224,810 B2
(45) Date of Patent: Jan. 18, 2022

(54) METHOD AND TERMINAL FOR DISPLAYING DISTANCE INFORMATION IN VIRTUAL SCENE

(71) Applicant: TENCENT TECHNOLOGY (SHENZHEN) COMPANY LIMITED, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/910,469

(22) Filed: Jun. 24, 2020

(65) Prior Publication Data
US 2020/0316470 A1 Oct. 8, 2020

Related U.S. Application Data

(63) Continuation of application No. PCT/CN2019/078742, filed on Mar. 19, 2019.

(30) Foreign Application Priority Data

Apr. 27, 2018 (CN) .......................... 201810392855.1

(51) Int. Cl.
A63F 13/537 (2014.01)
(52) U.S. Cl.
CPC .................. *A63F 13/537* (2014.09)
(58) Field of Classification Search
CPC .... A63F 13/5375; A63F 13/52; A63F 13/537; A63F 2300/303; A63F 2300/306
See application file for complete search history.

(56) References Cited

U.S. PATENT DOCUMENTS 8,641,526 B1\* 2/2014 Sitnikov ................. A63F 13/67
463/37
2013/0172083 A1 7/2013 Sivak
(Continued)

FOREIGN PATENT DOCUMENTS

CN 105999703 10/2016
CN 107376339 11/2017
(Continued)

OTHER PUBLICATIONS

YouTube video by user Phy, "Use Your Minimap Like a Pro," published Sep. 3, 2016, downloaded at https://www.youtube.com/watch?v=Rk3NylyBK2E (Year: 2016).*
(Continued)

*Primary Examiner* — Eric J Yoon
(74) *Attorney, Agent, or Firm* — Crowell & Moring

(57) ABSTRACT

This disclosure relates to a distance information display method in a virtual scene and a terminal. The method includes: obtaining location information of a target location point in the virtual scene; obtaining distance information according to the location information of the target location point; and displaying the distance information corresponding to an indication icon of the target location point in a scene picture of the virtual scene. According to the foregoing solution, in a virtual scene, for a target location point at which an indication icon exists in a scene picture of the virtual scene, the terminal may display information about a distance between a current controlled object and the target location point corresponding to the indication icon in the scene picture of the virtual scene.

18 Claims, 15 Drawing Sheets

(56) References Cited

U.S. PATENT DOCUMENTS

2016/0187654 A1* 6/2016 Border ............... G02B 5/18
                                                        359/567
2019/0076739 A1* 3/2019 Ge .................... A63F 13/837

FOREIGN PATENT DOCUMENTS

| CN | 107596691 | 1/2018 |
| CN | 107789837 | 3/2018 |
| CN | 107957781 | 4/2018 |
| CN | 108619721 | 10/2018 |
| JP | 2015-196-42 | 11/2015 |
| JP | 2017-055995 | 3/2017 |

OTHER PUBLICATIONS mmorpg.com website, "A Look at the Minimap," posted Jan. 19, 2009, downloaded from https://www.mmorpg.com/system-focus/a-look-at-the-minimap-2000116407 (Year: 2009).*

YouTube video, "World of Tanks: How to Adjust the Mini-map," published Mar. 23, 2015, downloaded at https://www.youtube.com/watch?v=biNGixxjwBI (Year: 2015).*

YouTube video, "World of Warships Settings Guide—Before You Play," published Aug. 7, 2017, downloaded from https://www.youtube.com/watch?v=n0eFRhbBON4 (Year: 2017).*

YouTube video, "World of Warships—My BEST Game Ever! Absolute Massacre!," published Jun. 23, 2015, downloaded from https://www.youtube.com/watch?v=g7WaWguDPeY (Year: 2015).*

YouTube video, "Let's Play Mechwarrior 4: Mercenaries—Part 1," published Jan. 17, 2016, downloaded from https://www.youtube.com/watch?v=Juo7wP6u7X0 (Year: 2016).*

YouTube video provided by user AARP, "Getting Directions with Google Maps," published May 18, 2016, downloaded from https://www.youtube.com/watch?v=wsWwnq97ywQ (Year: 2016).*

YouTube video, "How to Mark Map," published Jan. 17, 2018, downloaded from https://www.youtube.com/watch?v=XSrysuiFjls (Year: 2018).*

International Search Report issued in PCT/CN2019/078742 dated May 27, 2019.

https://www.bilibili.com/video/av21259913?from=search&seid=9099229854104408779, Mar. 26, 2018, this reference discloses a method of displaying distance information in a virtual scenario.

https://www.bilibili.com/video/av21381906?from=search&seid=11626789649962756191, Mar. 29, 2018, this reference discloses a method of displaying the distance between tagged location and the player's current location in a video game map.

Office Action issued in Japanese application 2020-568588 dated Oct. 26, 2021, 4 pages.

Translation of Office Action issue in Japanese application 2020-568588, 4 pages.

Yugen Co., Ltd., "Aeronodting I Official Complete Guide", first edition, Soft Bank Publishing Company, 2001, pp. 8-10.

* cited by examiner

METHOD AND TERMINAL FOR DISPLAYING DISTANCE INFORMATION IN VIRTUAL SCENE

RELATED APPLICATION

This application is a continuation application of PCT Patent Application No. PCT/CN2019/078742, filed on Mar. 19, 2019, which claims priority to Chinese Patent Application No. 201810392855.1, filed on Apr. 27, 2018 and entitled "DISTANCE INFORMATION DISPLAY METHOD IN VIRTUAL SCENE, APPARATUS AND COMPUTER DEVICE", wherein the entirety of each of the above-referenced applications is incorporated herein by reference in its entirety.

FIELD OF THE TECHNOLOGY

This application relates to the field of computer application technologies, and in particular, to a distance information display method in a virtual scene, a terminal, and a computer device.

BACKGROUND OF THE DISCLOSURE

A user has a requirement for obtaining a distance between a current controlled object and a target point in many application programs (for example, a virtual reality application program, a three-dimensional map program, a military simulation program, a first-person shooting game, and a multiplayer online battle arena game) constructing a virtual scene.

In the related art, the application program constructing a virtual scene may indicate, by using a map, a distance between virtual objects controlled by two users. For example, in one virtual scene, in a case that two or more users team up, when one of the users needs to know a distance between a current controlled object and a virtual object controlled by a teammate, the user may open a map interface, and the distance between the virtual object controlled by the teammate and the current controlled object of the user is displayed in the map interface.

However, in the related art, the user needs to open the map interface to view the distance between the virtual object controlled by the teammate and the current controlled object of the user. The foregoing operation of opening a map needs to consume a specific operating time, and inevitably affects another operation of the user in the virtual scene, causing a relatively poor display effect of the distance information.

SUMMARY

Embodiments of this disclosure provide a distance information display method in a virtual scene, a terminal, and a computer device, to resolve the problem in the related art that the user needs to open a map interface to view a distance between a virtual object controlled by a teammate and a current controlled object of the user, which needs to consume a specific operating time, and inevitably affects another operation of the user in the virtual scene, causing a relatively poor display effect of the distance information, so that the display effect of the distance information is improved. The technical solutions are as follows:

According to an aspect, a distance information display method in a virtual scene is provided, performed by a terminal, and including:

obtaining location information of a target location point in the virtual scene, the target location point comprising a location point at which an indication icon exists in a scene picture of the virtual scene, and the scene picture being a picture of the virtual scene viewed from a viewing angle of a current controlled object;

obtaining distance information according to the location information of the target location point, the distance information indicating a distance between the target location point and the current controlled object; and displaying the distance information corresponding to the indication icon of the target location point in the scene picture of the virtual scene.

According to an aspect, a distance information display terminal in a virtual scene is provided, including a memory operable to store program code and a processor operable to read the program code. The processor may be configured to:

obtain location information of a target location point in the virtual scene, the target location point comprising a location point at which an indication icon exists in a scene picture of the virtual scene, and the scene picture being a picture of the virtual scene viewed from a viewing angle of a current controlled object;

obtain distance information according to the location information of the target location point, the distance information being indicating a distance between the target location point and the current controlled object; and display the distance information corresponding to the indication icon of the target location point in the scene picture of the virtual scene.

Optionally, the processor may be further configured to:

obtain a target size of the indication icon of the target location point according to the distance information; and adjust a size of the indication icon of the target location point to the target size.

Optionally, the processor may be configured to, in response to a distance display condition being met, display the distance information corresponding to the indication icon of the target location point in the scene picture of the virtual scene, the distance display condition may include at least one of:

the current controlled object being located in a second specified region in the virtual scene;

the distance between the target location point and the current controlled object being greater than a distance threshold;

the target location point being located within a viewing angle range in front of the current controlled object; or the target location point being located outside the scene picture of the virtual scene.

According to another aspect, a product is provided, including machine-readable media other than a transitory signal and instructions stored on the machine-readable media. The instructions may be configured to, when executed, cause a machine to:

obtain location information of a target location point in the virtual scene, the target location point comprising a location point at which an indication icon exists in a scene picture of the virtual scene, and the scene picture being a picture of the virtual scene viewed from a viewing angle of a current controlled object;

obtain distance information according to the location information of the target location point, the distance information indicating a distance between the target location point and the current controlled object; and display the distance information corresponding to the indication icon of the target location point in the scene picture of the virtual scene.

According to another aspect, a computer device is provided, including a processor and a memory, the memory storing at least one instruction, at least one program, a code set or an instruction set, and the at least one instruction, the at least one program, the code set or the instruction set being loaded and executed by the processor to implement the foregoing distance information display method in a virtual scene.

According to still another aspect, a computer-readable storage medium is provided, storing at least one instruction, at least one program, a code set or an instruction set, the at least one instruction, the at least one program, the code set or the instruction set being loaded and executed by a processor to implement the foregoing distance information display method in a virtual scene.

The technical solutions provided in this disclosure may have the following advantageous effects:

In a virtual scene, for a target location point at which an indication icon exists in a scene picture of the virtual scene, the terminal may display information about a distance between a current controlled object and the target location point corresponding to the indication icon in the scene picture of the virtual scene. In this way, the user does not need to open a map of the virtual scene, so that the display of the distance information is more direct without affecting another operation of the user in the virtual scene, thereby improving the display effect of the distance information.

It is to be understood that the above general descriptions and the following detailed descriptions are merely for exemplary and explanatory purposes, and cannot limit this disclosure.

BRIEF DESCRIPTION OF THE DRAWINGS

The accompanying drawings herein are included in the specification and form a part of the specification, show embodiments that conform to this disclosure, and are used to describe a principle of this disclosure together with the specification.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent same or similar elements. The following implementations described in the following exemplary embodiments do not represent all implementations that are consistent with this disclosure. On the contrary, the implementations are merely examples of physical devices and methods that are described in detail in the appended claims and that are consistent with some aspects of this disclosure.

Virtual scene: a virtual scene displayed (or provided) when an application program is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene, and description is made by using an example in which the virtual scene is a three-dimensional virtual scene in the following embodiments, but this is not limited. Optionally, the virtual scene is further used for a virtual scene battle between at least two virtual roles. Optionally, the virtual scene is further used for a battle between at least two virtual roles by using virtual guns. Optionally, the virtual scene is further used for a battle between at least two virtual roles by using virtual guns in a range of a target region, and the range of the target region may be continuously decreased as time goes by in the virtual scene.

Virtual object: a movable object in a virtual scene. The movable object may be at least one of a virtual character, a virtual animal, and a cartoon character. Optionally, in a case that the virtual scene is a three-dimensional virtual environment, the virtual object is a three-dimensional model created based on a skeletal animation technology. Each virtual object has a shape and a volume in the three-dimensional virtual scene, and occupies some space in the three-dimensional virtual scene.

The virtual scene is generally generated by an application program in a terminal such as a computer device and presented based on hardware (for example, a screen) in the terminal. The terminal may be a mobile terminal such as a smartphone, a tablet computer, or an e-book reader. Alternatively, the terminal may be a personal computer device such as a notebook computer or a fixed computer.

Figure 1:
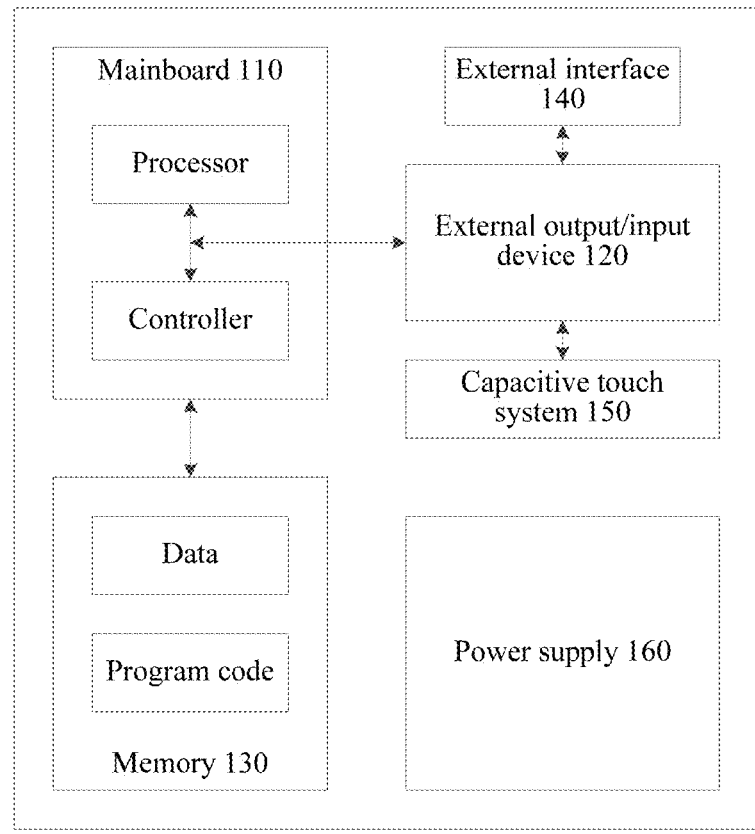
FIG. 1 is a schematic structural diagram of a terminal according to an exemplary embodiment.

FIG. 1 shows a schematic structural diagram of a terminal according to an exemplary embodiment. As shown in FIG. 1, the terminal includes a mainboard 110, an external output/input device 120, a memory 130, an external interface 140, a capacitive touch system 150, and a power supply 160.

Processing elements such as a processor and a controller are integrated in the mainboard 110.

The external output/input device 120 may include a display component (for example, a display screen), a sound playback component (for example, a loudspeaker), a sound collecting component (for example, a microphone), and various types of buttons.

The memory 130 stores program code and data.

The external interface 140 may include an earphone interface, a charging interface, and a data interface.

The capacitive touch system 150 may be integrated in the display component or a button of the external output/input device 120, and the capacitive touch system 150 is configured to detect a touch operation performed by the user on the display component or the button.

The power supply 160 is configured to supply power to other components in the terminal.

In an embodiment, the processor in the mainboard 110 may generate a virtual scene by executing or invoking program code and data stored in the memory, and present the generated virtual scene by using the external output/input device 120. In a process of presenting the virtual scene, a touch operation performed when the user interacts with the virtual scene may be detected by using the capacitive touch system 150.

Figure 2:
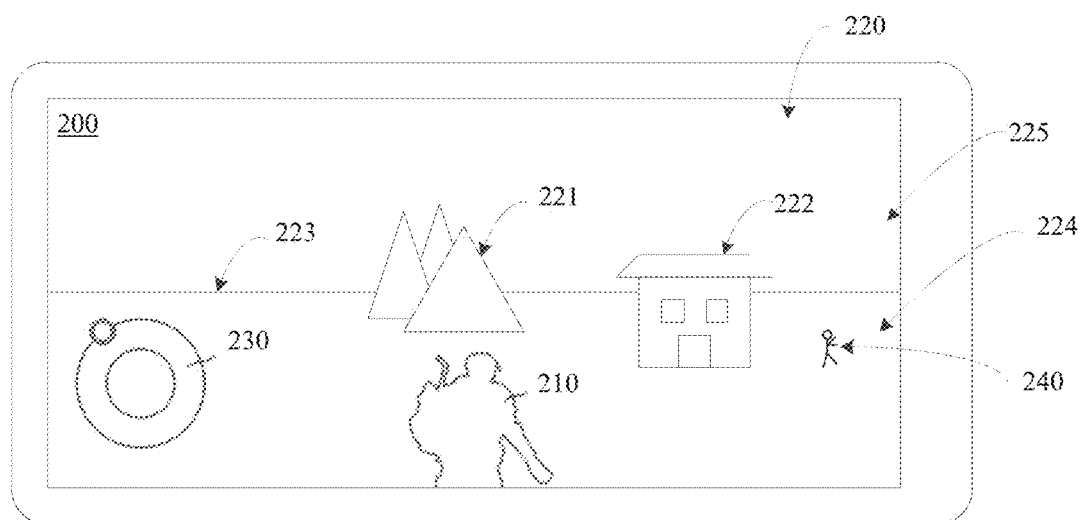
FIG. 2 is a schematic diagram of a scene picture of a virtual scene according to an exemplary embodiment.

The virtual scene may be a three-dimensional virtual scene, or the virtual scene may be a two-dimensional virtual scene. Using an example in which the virtual scene is a three-dimensional virtual scene, FIG. 2 shows a schematic diagram of a scene picture of a virtual scene according to an exemplary embodiment. As shown in FIG. 2, a scene picture 200 of the virtual scene includes a virtual object 210, an environment picture 220 of the three-dimensional virtual scene, at least one set of virtual control button 230, and a virtual object 240. The virtual object 210 may be a current controlled object of a user corresponding to a terminal, and the virtual control button 230 is an optional control element, that is, the user may control the virtual object 210 by using the virtual control button 230. The virtual object 210 may be a non-user controlled object, that is, the virtual object 240 is autonomously controlled by an application program, or the virtual object 240 may be a virtual object controlled by a user corresponding to another terminal. The user may control the virtual object 210 to interact with the virtual object 240, for example, control the virtual object 210 to attack the virtual object 240.

In FIG. 2, the virtual object 210 and the virtual object 240 are three-dimensional models in the three-dimensional virtual scene, and the environment picture of the three-dimensional virtual scene displayed in the scene picture 200 includes objects observed from a viewing angle of the virtual object 210. Exemplarily, as shown in FIG. 2, under the observation from the viewing angle of the virtual object 210, the displayed environment picture 220 of the three-dimensional virtual scene includes the earth 224, the sky 225, the horizon 223, a hill 221, and a factory 222.

The virtual object 210 may move in real time under the control of the user. For example, the virtual control button 230 shown in FIG. 2 is a virtual button configured to control the movement of the virtual object 210, and in a case that the user touches the virtual control button 230, the virtual object 210 may move toward a direction of a touch point relative to a center of the virtual control button 230 in the virtual scene.

Figure 3:
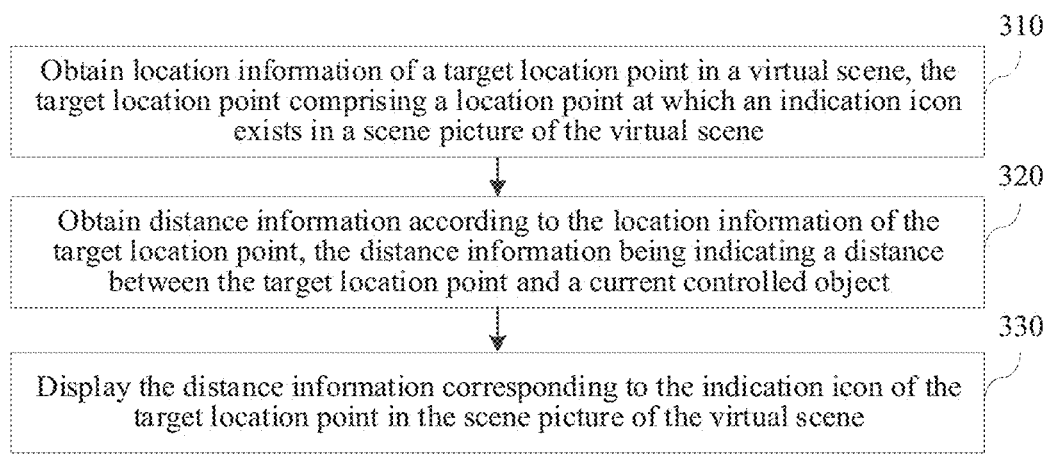
FIG. 3 is a schematic diagram of a distance information display process in a virtual scene according to an exemplary embodiment.

FIG. 3 shows a schematic diagram of a distance information display process in a virtual scene according to an exemplary embodiment. As shown in FIG. 3, a terminal (for example, the terminal shown in FIG. 1) running the application program corresponding to the foregoing virtual scene may perform the following steps to display information about a distance between a current controlled object and a target location point.

Step 310: Obtain location information of a target location point in a virtual scene, the target location point being a location point at which an indication icon exists in a scene picture of the virtual scene, and the scene picture being a picture of the virtual scene viewed from a viewing angle of a current controlled object.

In this embodiment, the current controlled object refers to the virtual object controlled by the terminal generating the virtual scene in the foregoing virtual scene. For example, using an example in which the virtual scene is a shooting game scene, the current controlled object may be a virtual soldier located in the game scene and controlled, through the terminal, by a user corresponding to the current terminal.

Step 320: Obtain distance information according to the location information of the target location point, the distance information indicating a distance between the target location point and a current controlled object.

In this embodiment, the distance between the target location point and the current controlled object may be a virtual distance between the target location point and the current controlled object in the foregoing virtual scene.

Step 330: Display the distance information corresponding to the indication icon of the target location point in the scene picture of the virtual scene.

According to the solution shown in FIG. 3, in a virtual scene, for a target location point at which an indication icon exists in a scene picture of the virtual scene, the terminal may display information about a distance between a current controlled object and the target location point corresponding to the indication icon in the scene picture of the virtual scene. In this way, the user does not need to open a map of the virtual scene, so that the display of the distance information is more direct without affecting another operation of the user in the virtual scene, thereby improving the display effect of the distance information.

In this embodiment, in a case that the terminal displays distance information corresponding to the indication icon of the target location point, the distance information may be displayed at a specified location around the target location point in a text form in the scene picture of the virtual scene.

The specified location around the target location point may be tightly next to the left, the right, the top, or the bottom of the target location point.

Figure 4:
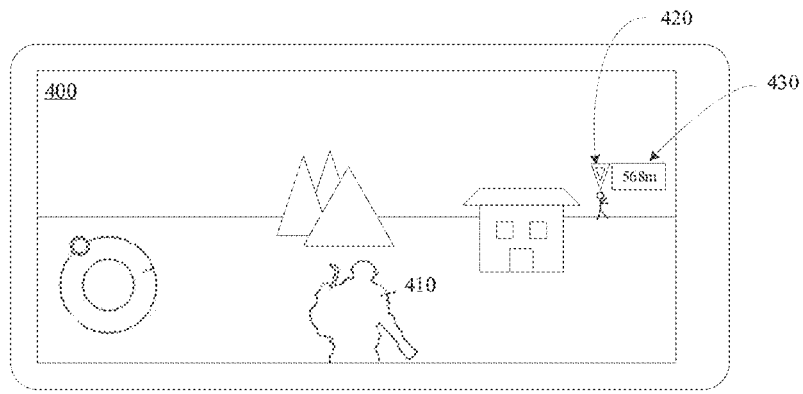
FIG. 4 is a schematic diagram of a type of display of distance information involved in the embodiment shown in FIG. 3.

For example, FIG. 4 shows a schematic diagram of a type of display of distance information involved in an embodiment. As shown in FIG. 4, a virtual scene 400 displayed by a terminal includes a current controlled object 410, and an indication icon 420 (that is, an inverted triangular icon in FIG. 4) of a target location point. A display box 430 is further displayed on the left and tightly next to the indication icon 420, and value text (568 m displayed in FIG. 4) of a distance between a target location point corresponding to the indication icon 420 and the current controlled object 410 is displayed in the display box 430.

In another implementation, in a case that the terminal displays distance information corresponding to the indication icon of the target location point, the distance information may be displayed at a specified location around the target location point in a graph form in the scene picture of the virtual scene.

Figure 5:
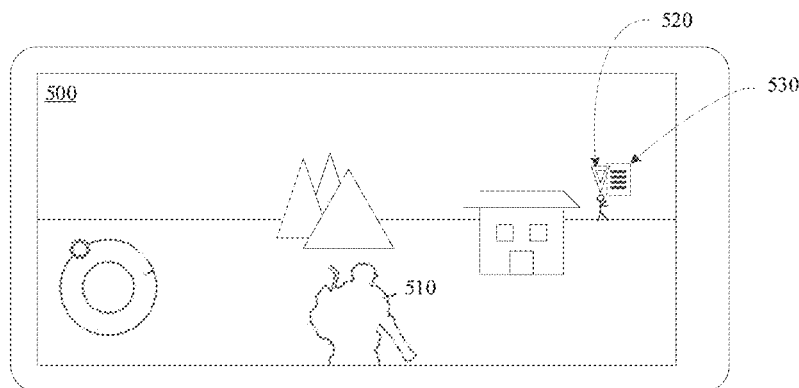
FIG. 5 is a schematic diagram of another type of display of distance information involved in the embodiment shown in FIG. 3.

For example, FIG. 5 shows a schematic diagram of another type of display of distance information involved in an embodiment. As shown in FIG. 5, a virtual scene 500 displayed by a terminal includes a current controlled object 510, and an indication icon 520 (that is, an inverted triangular icon in FIG. 5) of a target location point. A distance indication graph 530 is further displayed on the left and tightly next to the indication icon 520, the distance indication graph 530 is formed by one or more horizontal bars, and the quantity of the horizontal bars in the distance indication graph 530 indicates a distance between a corresponding target location point and the current controlled object 510. For example, the greater the quantity of the horizontal bars in the distance indication graph 530 is, the longer the distance between the target location point and the current controlled object 510 is.

In the solution shown in this disclosure, to ensure the brevity of the scene picture of the virtual scene, a specific condition may be set on the display of the distance information, and only when the set condition is met, the distance information is displayed in the scene picture of the virtual scene.

Figure 6:
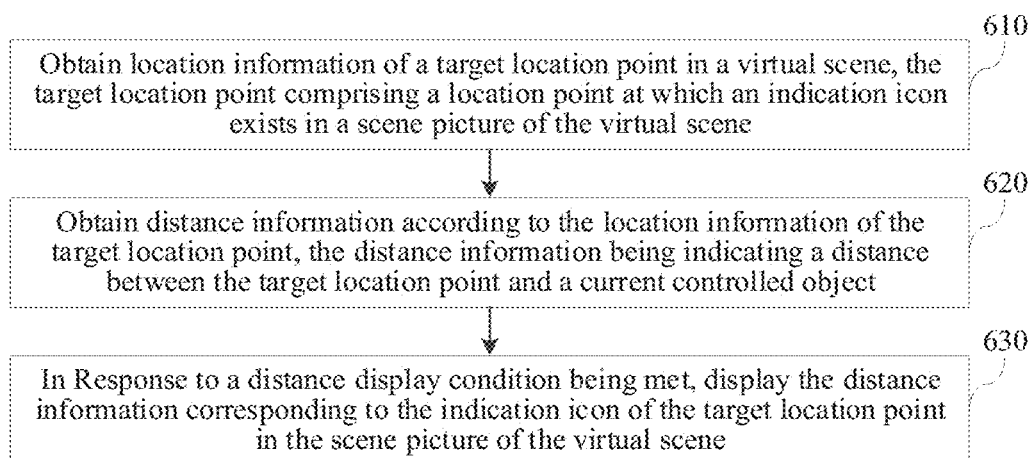
FIG. 6 is a flowchart of a distance information display method in a virtual scene according to an exemplary embodiment.

FIG. 6 shows a flowchart of a distance information display method in a virtual scene according to an exemplary embodiment. Using an example in which a specific condition is set on display of distance information, as shown in FIG. 6, the distance information display method in a virtual scene may include the following steps:

Step 610: Obtain location information of a target location point in a virtual scene, the target location point being a location point at which an indication icon exists in a scene picture of the virtual scene, and the scene picture being a picture of the virtual scene viewed from a viewing angle of a current controlled object.

In this embodiment, there may be some location points to which special attention of the user needs to be paid in the virtual scene, such as a location point at which a specified virtual object is located, a location point on a boundary of a specified region and closest to the current controlled object, or a marked location point in the virtual scene. To help the user timely learn orientations of the location points to which special attention needs to be paid, the terminal may display indication icons of the location points in the scene picture of the virtual scene. Location points having corresponding indication icons in the virtual scene may each be used as the foregoing target location point.

Optionally, a developer of an application program corresponding to the virtual scene may preset that a type of location point among the location points having corresponding indication icons in the virtual scene is the target location point. For example, the program developer of the application program may preset that a location point at which the specified virtual object is located is the target location point, and other location points having corresponding indication icons are not used as the target location point.

Alternatively, the user may autonomously set that a type of location point among the location points having corresponding indication icons in the virtual scene is the target location point. For example, the terminal may present a target location point setting interface to the user, and the target location point setting interface includes at least one checkable option. Each option corresponds to one location point having a corresponding indication icon in the virtual scene, and after the user checks, in the target location point setting interface, an option corresponding to the location point at which the specified virtual object is located, the terminal may set the location point at which the specified virtual object is located as the target location point.

In a case of displaying the scene picture of the virtual scene, the terminal may obtain location information of the target location point in the virtual scene, where the location information may be coordinates in a coordinate system corresponding to the virtual scene. The coordinate system corresponding to the virtual scene may be a horizontal coordinate system, or the coordinate system corresponding to the virtual scene may be a three-dimensional spatial coordinate system.

In this embodiment, the terminal may obtain the location information of the target location point in the virtual scene in real time. Alternatively, in a case that a location of the target location point in the virtual scene is unchangeable (for example, in a case that the target location point is a location point at which a marked building is located), the terminal may first obtain location information of the target location point and buffer the location information, and directly read the buffered location information when distance information needs to be displayed subsequently.

Step 620: Obtain distance information according to the location information of the target location point, the distance information indicating a distance between the target location point and a current controlled object.

In addition to obtaining the location information of the target location point, the terminal may further obtain location information of the current controlled object in the virtual scene in real time, and obtain, according to the location information of the target location point and the location information of the current controlled object, a distance between the current controlled object and the target location point through calculation, to obtain distance information corresponding to the target location point.

For example, using an example in which the distance information is coordinates in the coordinate system corresponding to the virtual scene, the terminal may obtain, according to coordinates of the current controlled object and coordinates of the target location point, a linear horizontal distance between the current controlled object and the target location point through simple geometric calculation, and use the linear horizontal distance obtained through calculation as the distance information corresponding to the target location point.

Alternatively, when the coordinate system corresponding to the virtual scene is a three-dimensional spatial coordinate system, the terminal may obtain, according to the coordinates of the current controlled object and the coordinates of the target location point, a linear three-dimensional spatial distance between the current controlled object and the target location point through geometric calculation, and use the linear three-dimensional spatial distance obtained through calculation as the distance information corresponding to the target location point.

Step 630: Display, in a case that a distance display condition is met, the distance information corresponding to the indication icon of the target location point in the scene picture of the virtual scene.

In this embodiment, before displaying the distance information, the terminal first determines whether a preset distance display condition is met; and if a determination result is that the distance display condition is met, the terminal performs a subsequent step of displaying the distance information, and if the determination result is that the distance display condition is not met, the terminal does not display the distance information.

The display condition may include the following types:

1) The current controlled object is located in a second specified region in the virtual scene.

In actual application, the virtual scene may be divided into a plurality of regions, and different regions have different functions. Correspondingly, distance information needs to be displayed in some regions, but distance information may not need to be displayed in some other regions. Therefore, in this embodiment of this application, before displaying the distance information, the terminal may first determine whether the current controlled object is located in the second specified region in which distance information needs to be displayed; and if yes, the terminal performs a subsequent step of displaying the distance information. Otherwise, the terminal may not display the foregoing distance information.

For example, using an arena game as an example, it is assumed that a virtual scene of the arena game includes a birth region and an arena region. Roles of users are born in the birth region, and are uniformly airdropped to the arena region for arena activities, where the birth region does not need to display the foregoing distance information. To improve the brevity of the scene picture when the roles of the users are in the birth region, the terminal performs a subsequent step of displaying the distance information only when determining that the roles of the users are in the arena region.

2) The distance between the target location point and the current controlled object is greater than a distance threshold.

In the virtual scene, in a case that the current controlled object corresponding to the terminal is located around the target location point, the user generally does not need to know an exact distance between the current controlled object and the target location point. Therefore, in this embodiment, to improve the brevity of the interface display, before displaying the foregoing distance information, the terminal may first determine whether the distance between the current controlled object and the target location point is greater than a distance threshold, and if yes, the terminal performs the subsequent step of displaying the distance information. Otherwise, the terminal may not display the foregoing distance information.

The foregoing distance threshold may be preset by a developer. For example, the developer sets the distance threshold to 10 m according to experience, and in a case that the distance between the current controlled object corresponding to the terminal and the target location point is greater than 10 m, the terminal displays the distance information corresponding to the indication icon of the target location point. Otherwise, the terminal does not display the distance information.

Alternatively, when the foregoing distance information is displayed in a value text form and the value is rounded off to an integer, the foregoing distance threshold may be set to 1. That is, in a case that the distance between the current controlled object corresponding to the terminal and the target location point is greater than 1 m, the terminal displays the distance information corresponding to the indication icon of the target location point. Otherwise, the terminal does not display the distance information.

Alternatively, the foregoing distance threshold may be autonomously set by the user. For example, the terminal may present a distance threshold setting interface to the user, and after the user selects or writes a value in the distance threshold setting interface, the terminal sets a distance corresponding to the value as the foregoing distance threshold.

3) The target location point is located within a viewing angle range in front of the current controlled object.

In actual application, the user generally only focus on the target location point within a viewing angle range in front of the current controlled object. Therefore, in this embodiment, before displaying the information about the distance between the current controlled object and the target location point, the terminal may first determine whether the target location point is located within the viewing angle range in front of the current controlled object, and if yes, the terminal displays the distance information corresponding to the indication icon of the target location point. Otherwise, the terminal may not display the distance information of the target location point.

Figure 7:
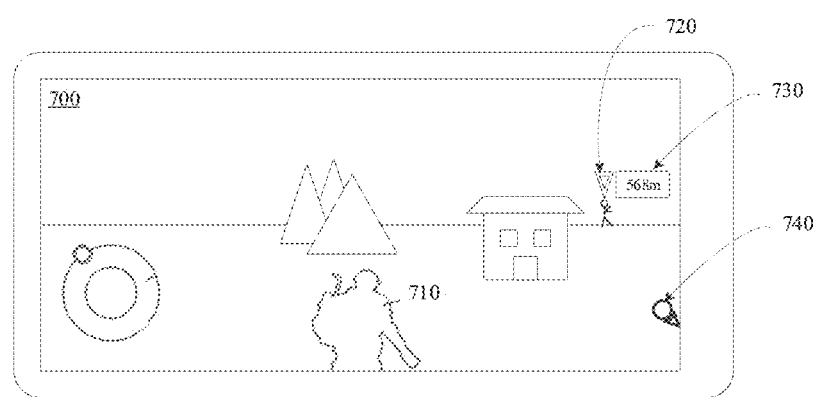
FIG. 7 is a schematic diagram of a type of display of distance information involved in the embodiment shown in FIG. 6.

For example, FIG. 7 shows a schematic diagram of a type of display of distance information involved in an embodiment. As shown in FIG. 7, a virtual scene 700 displayed by a terminal includes a current controlled object 710, and an indication icon 720 (that is, an inverted triangular icon in FIG. 7) of a target location point A. In FIG. 7, the target location point A is located within a viewing angle range in front of the current controlled object 710. In this case, a display box 730 is displayed by the terminal on the left and tightly next to the indication icon 720, and value text of a distance between the target location point A and the current controlled object 710 is displayed in the display box 730. A target location point B further exists in the virtual scene 700, the target location point B corresponds to an indication icon 740, and the target location point B is located outside the viewing angle range in front of the current controlled object 710 (for example, the target location point B may be located beside or behind the current controlled object 710). In this case, the indication icon 740 is displayed at an edge of a scene picture of the virtual scene 700, and indicates, by using an arrow, an orientation of the target location point B relative to the current controlled object 710. In addition, the terminal does not display, corresponding to the indication icon 740, information about a distance between the current controlled object 710 and the target location point B.

4) The target location point is located outside the scene picture of the virtual scene.

In this embodiment, that the target location point is located outside the scene picture of the virtual scene may generally mean that, the target location point is not directly displayed in the scene picture of the virtual scene. For example, in a case that the target location point is located outside the viewing angle range in front of the current controlled object, or in a case that the target location point is located within the viewing angle range in front of the current controlled object and outside the horizon, or in a case that the target location point is located within the viewing angle range in front of the current controlled object and blocked by another virtual object (for example, a house, a stone, a tree, or a hillside) within the horizon, each case may be considered as that the target location point is located outside the scene picture of the virtual scene.

Figure 8:
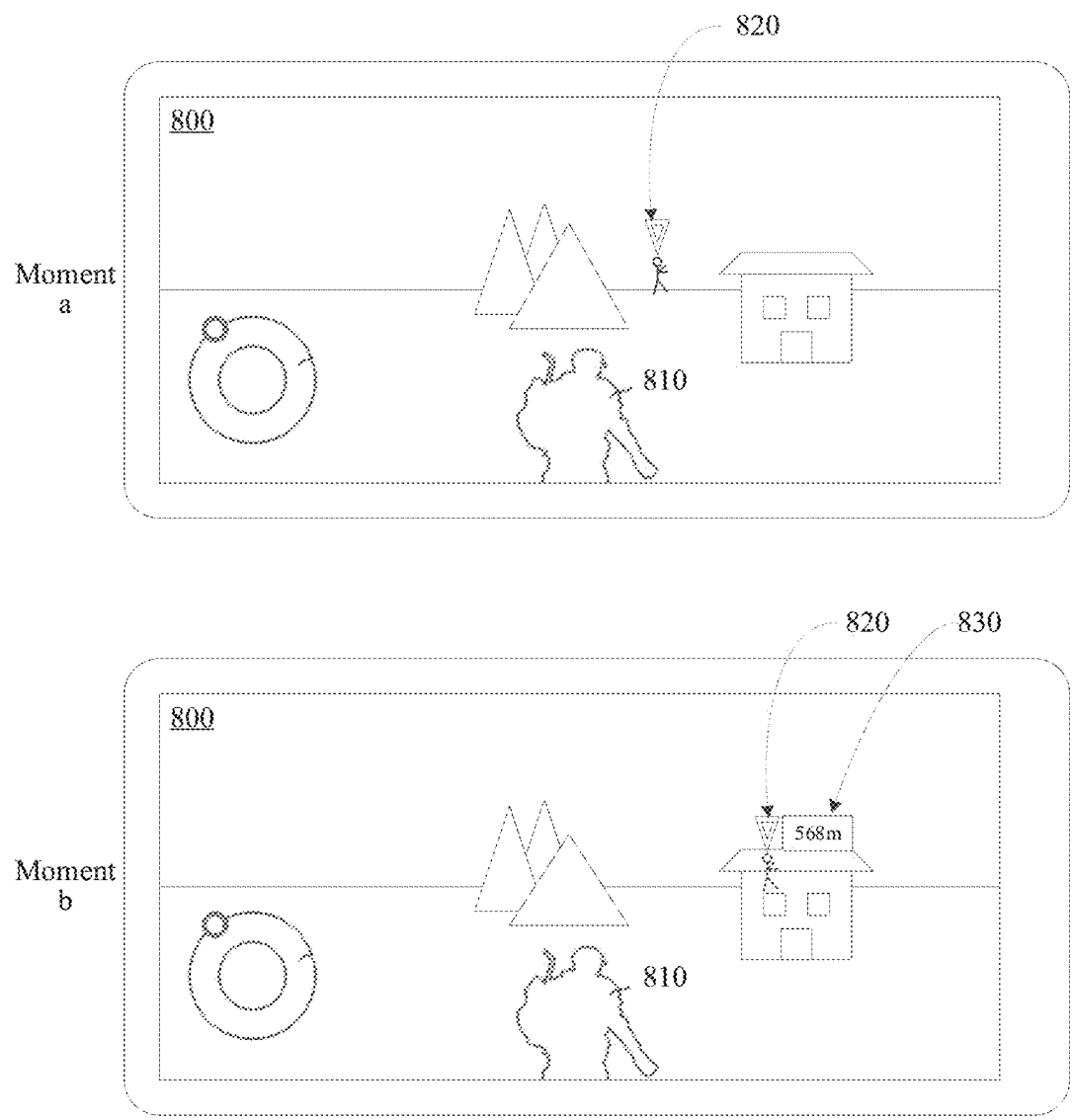
FIG. 8 is a schematic diagram of another type of display of distance information involved in the embodiment shown in FIG. 6.

For example, FIG. 8 shows a schematic diagram of another type of display of distance information involved in an embodiment. As shown in FIG. 8, a virtual scene 800 displayed by a terminal includes a current controlled object 810, and an indication icon 820 (that is, an inverted triangular icon in FIG. 8) of a target location point. The target location point is a location point at which a humanoid virtual object controlled by a computer or another user is located. At a moment a, a location point corresponding to the humanoid virtual object is located in the scene picture of the virtual scene, and the humanoid virtual object may be directly observed by the user. In this case, the terminal does not display distance information of the location point at which the humanoid virtual object is located. At a moment b after the moment a, the humanoid virtual object moves to the back of a house. In this case, the location point corresponding to the humanoid virtual object is located outside the scene picture of the virtual scene, and the humanoid virtual object cannot be directly observed by the user. In this case, the terminal displays a display box 830 corresponding to the indication icon 820, and displays, in the display box 830, distance information in a text form of the location point at which the humanoid virtual object is located.

In actual application, the foregoing four distance display conditions may be used independently. That is, in a case that the terminal determines that any one of the foregoing four distance display conditions is met, the terminal may perform the foregoing step of displaying the distance information. Alternatively, the foregoing four distance display conditions may be partially combined for use. That is, in a case that the terminal determines that two specified conditions or three specified conditions of the foregoing four distance display conditions are met, the terminal may perform the foregoing step of displaying the distance information. Alternatively, the foregoing four distance display conditions may be all combined for use. That is, in a case that the terminal determines that the foregoing four distance display conditions are all met, the terminal may perform the foregoing step of displaying the distance information.

In an implementation, the terminal may further adjust, according to the distance information, the indication icon corresponding to the target location point, to further indicate a distance between the target location point and the current controlled object. For example, the terminal may obtain, according to the distance information of the target location point, a target size of the indication icon of the target location point; and adjust a size of the indication icon of the target location point to the target size.

A correspondence between the indication icon of the target location point and the distance information may be preset in the terminal. In a case of adjusting the indication icon, the terminal may query, according to the distance information of the target location point, the correspondence to obtain the target size of the indication icon, and display, according to the target size obtained through querying, the indication icon in the scene picture of the virtual scene.

Figure 9:
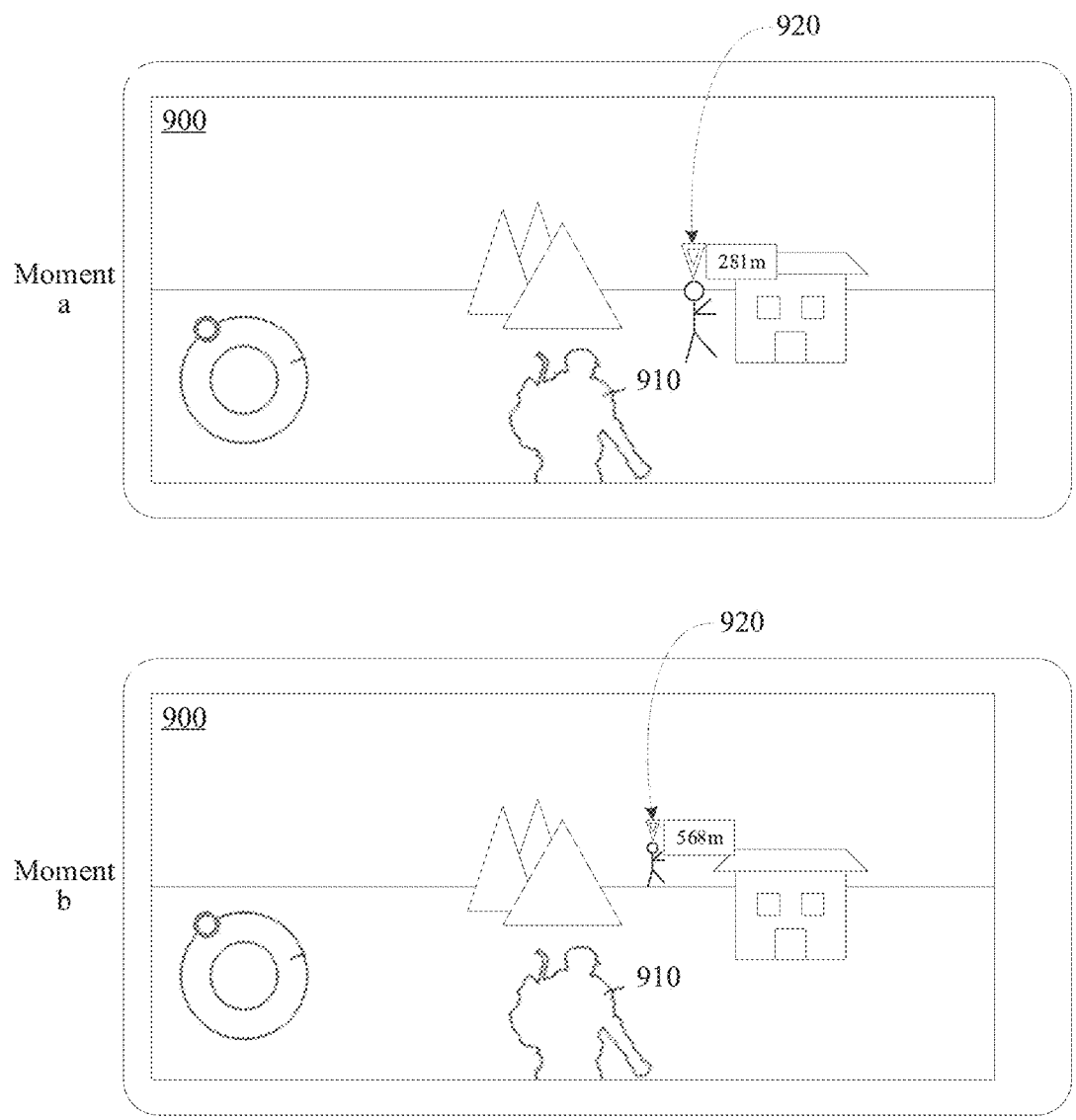
FIG. 9 is a schematic diagram of a type of display of an indication icon involved in the embodiment shown in FIG. 6.

For example, using an example in which the farther the distance indicated by the distance information is, the larger the target size of the corresponding indication icon is, FIG. 9 shows a schematic diagram of a type of display of an indication icon involved in an embodiment. As shown in FIG. 9, a virtual scene 90 displayed by a terminal includes a current controlled object 91, and an indication icon 92 (that is, an inverted triangular icon in FIG. 9) of a target location point. The target location point is a location point at which a humanoid virtual object controlled by a computer or another user is located. At a moment, a distance between the location point corresponding to the humanoid virtual object and the current controlled object is 281 m, and at the moment a, the terminal displays the indication icon 92 by using a first size. At a moment b, the humanoid virtual object moves to a far place, and a distance to the current controlled object is 568 m. In this case, the terminal displays the indication icon 92 by using a second size. It can be learned from FIG. 9 that the size of the indication icon 92 at the moment a is obviously larger than the size of the indication icon 92 at the moment b.

In FIG. 9, while displaying distance information of the target location point corresponding to the indication icon of the target location point, the terminal displays the indication icon at a size corresponding to the distance information. In another implementation, while displaying the indication icon of the target location point at the size corresponding to the distance information, the terminal may not display the distance information. That is, the terminal indicates, by using the size of the indication icon of the target location point, the distance between the target location point and the current controlled object in the scene picture of the virtual scene.

Based on the above, according to the solution shown in this embodiment, in a virtual scene, for a target location point at which an indication icon exists in a scene picture of the virtual scene, the terminal may display information about a distance between a current controlled object and the target location point corresponding to the indication icon in a text or graph form in the scene picture of the virtual scene. In this way, the user does not need to open a map of the virtual scene, so that the display of the distance information is more direct without affecting another operation of the user in the virtual scene, thereby improving the display effect of the distance information.

In addition, according to the solution shown in this embodiment, before the distance information is displayed, whether the distance display condition is met is first determined. Only when the distance display condition is met, the distance information of the target location point is displayed, so that unnecessary information display is avoided in the scene picture of the virtual scene, thereby improving the brevity of the scene picture.

In addition, in the solution shown in this embodiment, the terminal may adjust, according to the distance information of the target location point, the size of the indication icon of the target location point, to further improve the effect of indicating the distance between the target location point and the current controlled object.

In actual application, for different types of target location points, the display forms and display logic of the distance information of the target location points may also be different. In the subsequent embodiments, description is made by using an example in which the foregoing target location point is the location point at which the specified virtual object is located, the location point on the boundary of the specified region and closest to the current controlled object, or the marked location point in the virtual scene.

Based on the solution shown in FIG. 3 or FIG. 6, in an implementation, in a case that the target location point includes the location point at which the specified virtual object is located, and the indication icon of the target location point includes a first icon indicating the specified virtual object, the terminal may display, in a case that the scene picture of the virtual scene displays the distance information of the target location point, the first icon in a straight line direction of the specified virtual object relative to the current controlled object in the scene picture of the virtual scene; and display the distance information corresponding to the first icon.

There may be a plurality of types of specified virtual objects. For example, the specified virtual object may be a virtual object controlled by another user that is in the same team as the user corresponding to the terminal in the virtual scene, or the specified virtual object may be a marked hostile virtual object, or the specified virtual object may be a specified prop object (for example, a marked vehicle prop or weapon prop), and a specific form of the specified virtual object is not limited in the embodiments.

Figure 10:
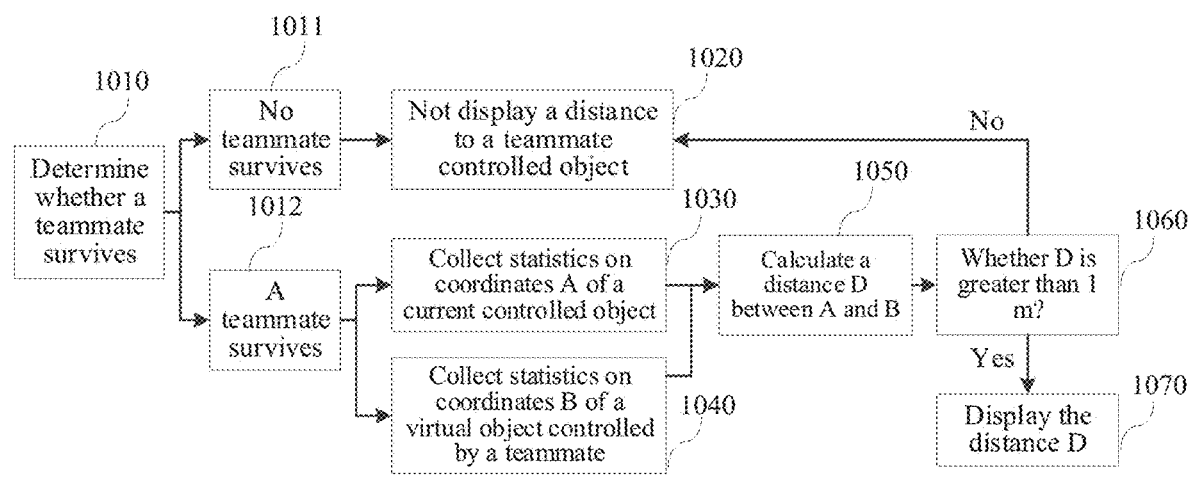
FIG. 10 is a flowchart of displaying a distance to a teammate controlled object according to an exemplary embodiment.

Using an example in which the specified virtual object is a virtual object controlled by another user that is in the same team as the user corresponding to the terminal, FIG. 10 shows a flowchart of displaying a distance to a teammate controlled object according to an exemplary embodiment. A shooting game scene in which virtual objects are born in a birth region and are uniformly dropped to an arena region for arena activities is used as an example. As shown in FIG. 10, in a case of teaming up, distances between the current controlled object and teammates are not displayed in the birth region. After the current controlled object is dropped to the arena region, the terminal first determines survival situations of the teammate controlled objects (that is, the virtual objects controlled by the teammates) (1010). If no teammate survives (1011), the terminal does not display the distances between the current controlled object and the teammate controlled objects (1020); and if a teammate survives (1012), the terminal collects statistics on coordinates A of the current controlled object (1030) and coordinates B of the virtual object controlled by the surviving teammate (1040). Then the terminal calculates a distance D (for example, D may be a horizontal distance between the coordinates A and the coordinates B (1050), and the distance D is rounded off to an integer) between the current controlled object and the virtual object controlled by the surviving teammate, and determines whether the distance D is greater than 1 m (that is, the distance threshold is 1 m)(1060). If yes, the terminal displays the distance D corresponding to the first icon of the virtual object controlled by the surviving teammate (1070). The distance between the current controlled object and the teammate may not be displayed in the mini-map.

Figure 11:
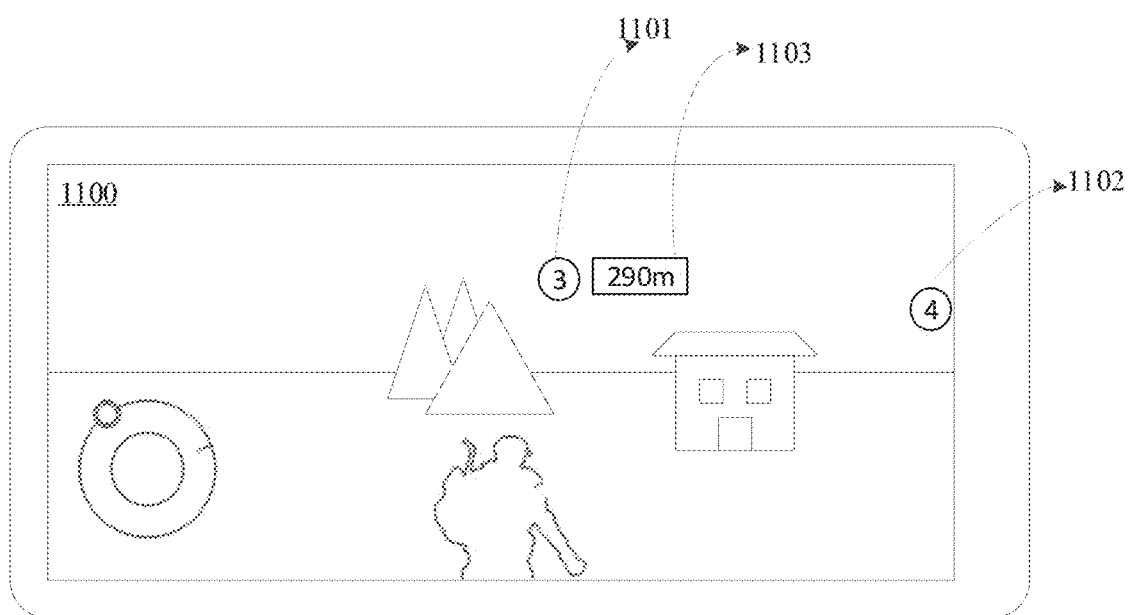
FIG. 11 is a schematic diagram of a type of display of a distance to a teammate involved in the embodiment shown in FIG. 10.

FIG. 11 shows a schematic diagram of a type of display of a distance to a teammate involved in an embodiment. As shown in FIG. 11, current surviving teammate controlled objects are a teammate controlled object 3 (corresponding to a circular icon 1101 labeled 3) and a teammate controlled object 4 (corresponding to a circular icon 1102 labeled 4), where the teammate controlled object 3 is located within a viewing angle range in front of the current controlled object, and the teammate controlled object 4 is located outside the viewing angle range in front of the current controlled object. The terminal displays the icon 1101 in a straight line direction between the current controlled object and the teammate controlled object 3, and displays a distance (290 m) between the current controlled object and the teammate controlled object 3 in a text box 1103 on the right side of the icon 1101, and a distance between the current controlled object and the teammate controlled object 4 is not displayed around the icon 1102.

Based on the solution shown in FIG. 3 or FIG. 6, in another implementation, the target location point includes a closest boundary point, the closest boundary point is a location point that is closest to the current controlled object among region boundary points, and the region boundary point is a location point on a boundary of a first specified region in the virtual scene. The current controlled object is located outside the first specified region, and the indication icon of the target location point include a second icon indicating a relative location between the current controlled object and the first specified region. The terminal may display, while displaying distance information of the target location point in the scene picture of the virtual scene, the second icon on a boundary of a mini-map in the scene picture of the virtual scene, where a location of the second icon on the boundary of the mini-map indicates a direction of the closest boundary point relative to the current controlled object; and display the distance information corresponding to the second icon.

The foregoing first specified region may be some regions in the virtual scene. For example, using an example in which the virtual scene is a shooting game scene, the foregoing first specified region may be a "safe zone" in the shooting game scene.

Figure 12:
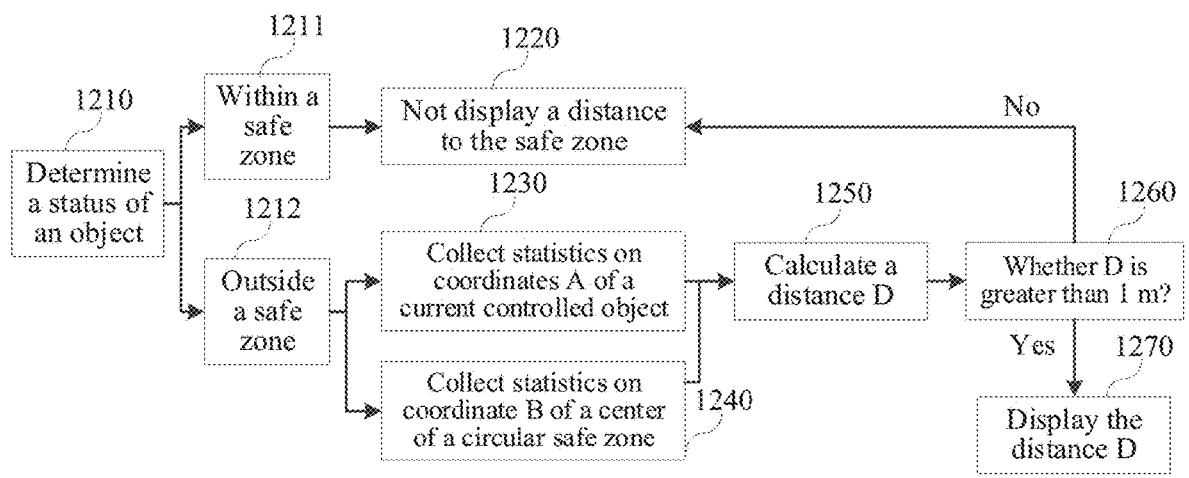
FIG. 12 is a flowchart of displaying a distance to a safe zone according to an exemplary embodiment.

Using an example in which the specified virtual object is a safe zone in a shooting game scene, FIG. 12 shows a flowchart of displaying a distance to a safe zone according to an exemplary embodiment. As shown in FIG. 12, the terminal first determines a status of the object (that is, whether the current controlled object is located in the safe zone) (1210). In a case that the current controlled object is located in the safe zone (1211), the terminal does not display the distance to the safe zone (1220), and in a case that the current controlled object is located outside the safe zone (1212), the terminal collects statistics on coordinates A of the current controlled object (1230) and coordinates B of a center of the circular safe zone (1240). Then the terminal calculates a distance D (for example, D may be a horizontal distance between the coordinates A and the coordinates B minus a radius r of the safe zone, and the distance D is rounded off to an integer) between the current controlled object and a point on an edge of the safe zone closest to the current controlled object (1250), and determines whether the distance D is greater than 1 m (that is, the distance threshold is 1 m) (1260). If yes, the terminal displays the distance D corresponding to the second icon indicating a relative direction between the safe zone and the current controlled object (1270).

Figure 13:
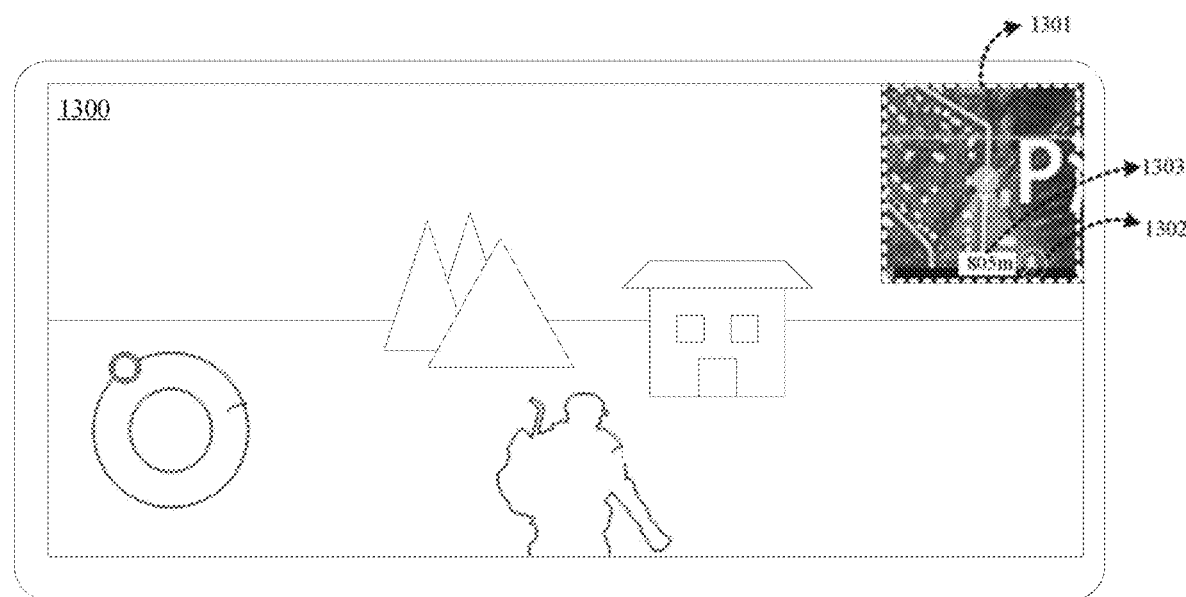
FIG. 13 is a schematic diagram of a type of display of a distance to a safe zone involved in the embodiment shown in FIG. 12.

FIG. 13 shows a schematic diagram of a type of display of a distance to a safe zone involved in an embodiment. As shown in FIG. 13, a mini-map 1301 is displayed at an upper right corner of a game interface, and a running icon 1302 is displayed at a lower edge of the mini-map 1301. A location of the running icon 1302 at the lower edge of the mini-map 1301 may indicate an orientation of the safe zone relative to the current controlled object, and the terminal displays a closest distance (805 m) between the current controlled object and the safe zone in a text box 1303 on one side of the running icon 1302. In addition, a distance between the text box 1303 and the running icon 1302 is fixed to 20 pixels, and the text box 1303 may move along with the icon 1302. In a case that the running icon 1302 moves to a location of which a distance to the left edge is a specific quantity of pixels, the text box 1303 appears at the right side of the icon 1302; and in a case that the running icon 1302 moves to a location of which a distance to the right edge is a specific quantity of pixels, the text box 1303 appears at the left side of the icon 1302.

Based on the solution shown in FIG. 3 or FIG. 6, in still another implementation, the target location point includes a marked location point, and the indication icon of the target location point includes a third icon indicating the marked location point. The terminal may display, while displaying distance information of the target location point in the scene picture of the virtual scene, the third icon in an orientation display region in the scene picture of the virtual scene, where a location of the third icon in the orientation display region indicates a direction of the marked location point relative to the current controlled object; and display the distance information corresponding to the third icon.

The foregoing orientation display region may alternatively be referred to as a virtual compass. The foregoing marked location point may be a location point autonomously marked by the user corresponding to the terminal, or the marked location point may be a location point marked by another user in the same team as the user corresponding to the terminal.

Figure 14:
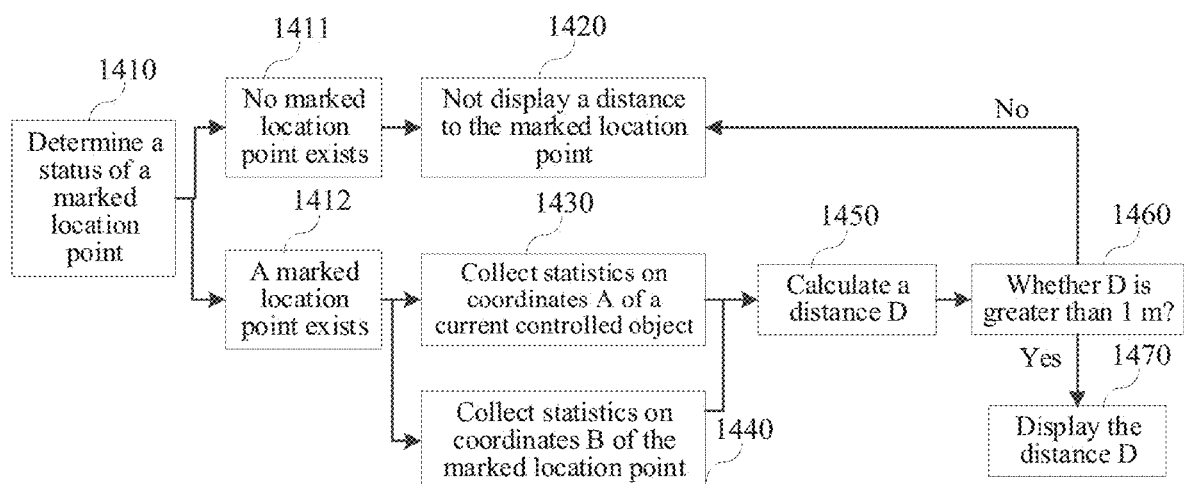
FIG. 14 is a flowchart of displaying a distance to a marked location point according to an exemplary embodiment.

FIG. 14 shows a flowchart of displaying a distance to a marked location point according to an exemplary embodiment. Using a game scene as an example, as shown in FIG. 14, the terminal first determines a status of a marked location point (the marked location point is the foregoing marked location point) (that is, determines whether there is a marked location point)(1410). If there is no marked location point in the game scene (1411), the terminal does not display a distance to the marked location point (1420), and if there is a marked location point in the game scene (1412), the terminal collects statistics on coordinates A of the current controlled object (1430) and coordinates B of the marked location point (1440). Then the terminal calculates a distance D (for example, D may be a horizontal distance between the coordinates A and the coordinates B, and the distance D is rounded off to an integer) between the current controlled object and the marked location point (1450), and determines whether the distance D is greater than 1 m (that is, the distance threshold is 1 m)(1460), and if yes, the terminal displays the distance D corresponding to an icon of the marked location point in the virtual compass (1470). The distance between the current controlled object and the marked location point may not be displayed in any minimap.

Figure 15:
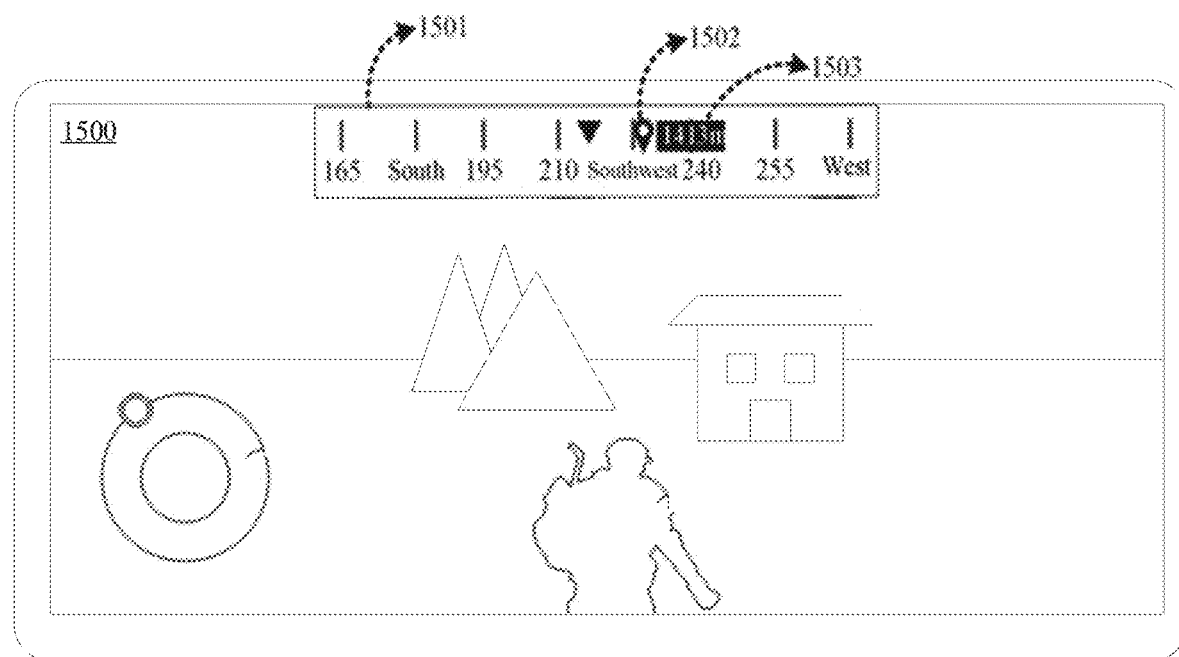
FIG. 15 is a schematic diagram of a type of display of a distance to a marked location point involved in the embodiment shown in FIG. 14.

FIG. 15 shows a schematic diagram of displaying a distance to a marked location point involved in an embodiment. A shooting game scene in which virtual objects are born in a birth region and are uniformly dropped to an arena region for arena activities is used as an example. As shown in FIG. 15, a virtual compass 1501 is displayed at an upper edge of a game interface, and an inverted water-drop-shaped icon 1502 is displayed in the virtual compass 1501. A location of the icon 1502 in the virtual compass 1501 may indicate an orientation of the marked location point relative to the current controlled object, and the terminal displays a closest distance (1413 m) between the current controlled object and the marked location point in a text box 1503 on one side of the icon 1502. In addition, the text box 1503 may move along with the icon 1502. In a case that the icon 1502 moves to a location of which a distance to the left edge of the virtual compass 1501 is a specific quantity of pixels, the text box 1503 appears at the right side of the icon 1502; and in a case that the icon 1502 moves to a location of which a distance to the right edge of the virtual compass 1501 is a specific quantity of pixels, the text box 1503 appears at the left side of the icon 1502. In the solution shown in FIG. 15, a distance needs to be displayed in the virtual compass provided that a player sets a marked location point in a map of the arena region. The distance may not be displayed for the marked location point that is set in a map of the birth region. In addition, the marked location point set by the player in the map of the birth region is removed after the current controlled object gets on an airplane.

Based on the solution shown in FIG. 3 or FIG. 6, in still another implementation, in a case that the target location point includes a marked location point, the terminal may present, while receiving an operation of unfolding the minimap, a map interface, where the map interface is for presenting a full map of the virtual scene; and display a fourth icon in the map interface, where the fourth icon is for indicating a location of the marked location point in the full map; and the terminal displays the distance information corresponding to the fourth icon.

Figure 16:
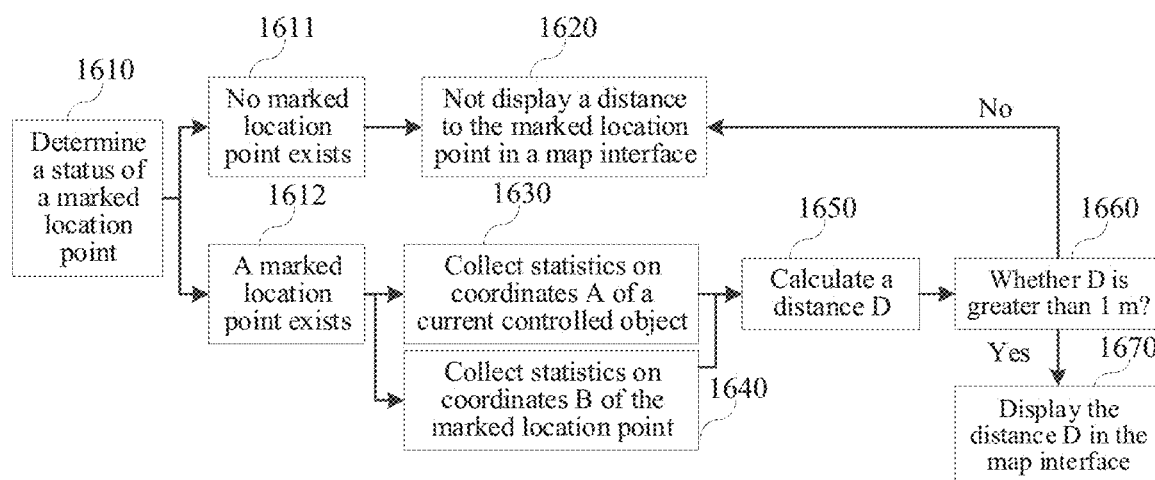
FIG. 16 is a flowchart of displaying a distance to a marked location point according to an exemplary embodiment.

FIG. 16 shows a flowchart of displaying a distance to a marked location point according to an exemplary embodiment. Using a game scene as an example, as shown in FIG. 16, after the terminal presents a map interface, the terminal first determines a status of the marked location point (that is, determines whether there is a marked location point) (1610). If there is no marked location point in the game scene (1611), the terminal does not display a distance to the marked location point in the map interface (1620), and if there is a marked location point in the game scene (1612), the terminal collects statistics on coordinates A of the current controlled object (1630) and coordinates B of the marked location point (1640). Then the terminal calculates a distance D (for example, D may be a horizontal distance between the coordinates A and the coordinates B. and the distance D is rounded off to an integer) between the current controlled object and the marked location point (1650), and determines whether the distance D is greater than 1 m (that is, the distance threshold is 1 m) (1660), and if yes, the terminal displays the distance D corresponding to an icon of the marked location point in the map interface (1670).

Figure 17:
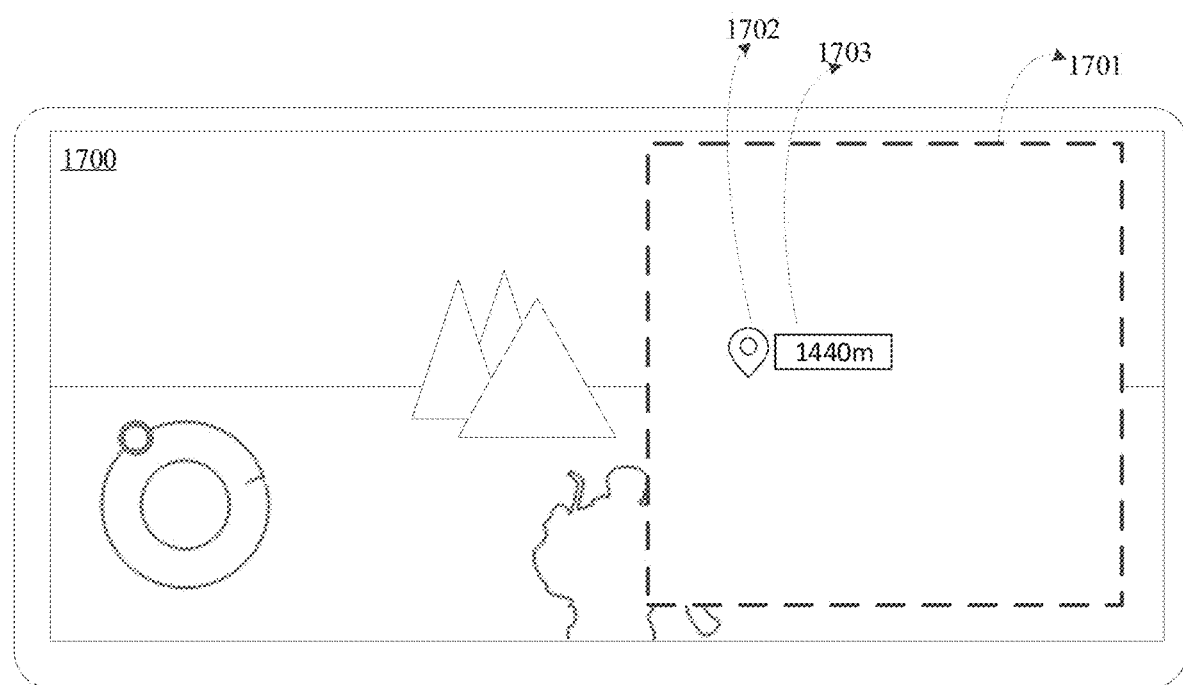
FIG. 17 is a schematic diagram of a type of display of a distance to a marked location point involved in the embodiment shown in FIG. 16.

FIG. 17 shows a schematic diagram of displaying a distance to a marked location point involved in an embodiment. As shown in FIG. 17, a map interface 1701 is displayed on an upper layer of a game interface, and an inverted water-drop-shaped icon 1702 is displayed in the map interface 1701. A location of the icon 1702 in the map interface 1701 may indicate a location of the marked location point in the game scene, and the terminal displays a closest distance (1440 m) between the current controlled object and the marked location point in a text box 1703 on one side of the icon 1702. In the solution shown in FIG. 17, a distance needs to be displayed in the map interface 1701 provided that the player sets a marked location point in a map of the arena region. The distance may not be displayed for the marked location point that is set in a map of the birth region. In addition, the marked location point set by the player in the map of the birth region is removed after the current controlled object gets on an airplane.

Optionally, the terminal may further present, while presenting the map interface, distance meshes on an upper layer of the map interface, and a side length of each mesh corresponds to a fixed distance in the virtual scene. Moreover, an icon of the marked location point and an icon of the current controlled object are presented in the map interface, to help the user approximately estimate, according to the quantity of meshes between the icon of the marked location point and the icon of the current controlled object, a distance between the marked location point and the current controlled object.

In a virtual scene, especially in an arena shooting game scene, team gaming can enable a player to experience more complete gaming fun, and is an indispensable important part of a game. While team gaming, location information and distance information of teammates are undoubtedly an important basis for the player to make a tactical decision. According to the foregoing solution of this disclosure, effective distance display may be performed, which can not only help the player quickly determine a specific location of a teammate through positioning, but also help the player effectively make a decision, to improve interactivity and strategy of the game. Moreover, the player may view a distance between the player and a marked point of a teammate in real time in the map interface and the virtual compass, to gradually provide the player with a sense of target and a sense of direction, so as to assist the player in better experiencing the game. The distance display within a field of view not only simplifies the operations of the player and reduces the operating frequency of the player, but also makes the presentation of information more direct and convenient and greatly enhances the effectiveness of the information. Moreover, each time the player is located outside the safe zone, a current closest distance between the player and the safe zone is displayed in real time, to assist the player in making a decision according to a current situation, thereby greatly enhancing strategy and interactivity of the game.

In addition to the arena shooting game scene, the foregoing solution may also be applied to another similar multiplayer cooperative game. According to the foregoing solution of this disclosure, a requirement of a player for knowing information about a teammate in a cooperative game can be effectively met, to help the player quickly and accurately determine a location of the teammate through positioning, and make a decision; besides, complicated operations of the player for obtaining distance information are significantly simplified, game fluency of the player is improved, and an entry barrier of the game is lowered, so that the player is quickly familiar with the game; in addition, this solution can further establish an effective communication channel and relationship between players, to help create a sense of trust and a sense of interaction between the players, thereby improving a sense of identity of the players for the game and growth in skill.

Figure 18:
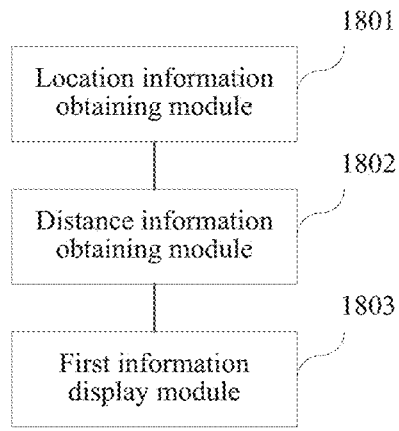
FIG. 18 is a structural block diagram of a terminal according to an exemplary embodiment.

FIG. 18 is a structural block diagram of a terminal according to an exemplary embodiment. The terminal may perform all or some steps performed by a terminal in the method shown in the embodiment corresponding to FIG. 3 or FIG. 6. The terminal may include:

a location information obtaining module 1801, configured to obtain location information of a target location point in the virtual scene, the target location point being a location point at which an indication icon exists in a scene picture of the virtual scene, and the scene picture being a picture of the virtual scene viewed from a viewing angle of a current controlled object;

a distance information obtaining module 1802, configured to obtain distance information according to the location information of the target location point, the distance information indicating a distance between the target location point and the current controlled object; and a first information display module 1803, configured to display the distance information corresponding to the indication icon of the target location point in the scene picture of the virtual scene.

Optionally, the target location point includes a location point at which a specified virtual object is located, and the indication icon of the target location point includes a first icon indicating the specified virtual object; and the first information display module 1803 includes:

a first icon display unit, configured to display the first icon in a straight line direction of the specified virtual object relative to the current controlled object in the scene picture of the virtual scene; and a first information display unit, configured to display the distance information corresponding to the first icon.

Optionally, the target location point includes a closest boundary point, the closest boundary point being a location point that is closest to the current controlled object among region boundary points, the region boundary point being a location point on a boundary of a first specified region in the virtual scene, and the current controlled object being located outside the first specified region; the indication icon of the target location point includes a second icon indicating a relative location between the current controlled object and the first specified region; and the first information display module 1803 includes:

a second icon display unit, configured to display the second icon on a boundary of a mini-map in the scene picture of the virtual scene, a location of the second icon on the boundary of the mini-map indicating a direction of the closest boundary point relative to the current controlled object; and a second information display unit, configured to display the distance information corresponding to the second icon.

Optionally, the target location point includes a marked location point, and the indication icon of the target location point includes a third icon indicating the marked location point; and the first information display module 1803 includes:

a third icon display unit, configured to display the third icon in an orientation display region in the scene picture of the virtual scene, a location of the third icon in the orientation display region indicating a direction of the marked location point relative to the current controlled object; and a third information display unit, configured to display the distance information corresponding to the third icon.

Optionally, the terminal further includes:

a map presenting module, configured to present a full map in a case of receiving an operation of unfolding the mini-map; and a second information display module, configured to display a fourth icon in the full map, the fourth icon indicating a location of the marked location point in the full map; and display the distance information corresponding to the fourth icon.

Optionally, the first information display module 1803 is configured to display the distance information at a specified location around the target location point in a text form in the scene picture of the virtual scene.

Optionally, the terminal further includes:

a size determining module, configured to obtain a target size of the indication icon of the target location point according to the distance information; and a size adjusting module, configured to adjust a size of the indication icon of the target location point to the target size.

Optionally, the first information display module 1803 is configured to perform, in a case that a distance display condition is met, the operation of displaying the distance information corresponding to the indication icon of the target location point in the scene picture of the virtual scene, the distance display condition including at least one of the following conditions:

the current controlled object being located in a second specified region in the virtual scene;

the distance between the target location point and the current controlled object being greater than a distance threshold;

the target location point being located within a viewing angle range in front of the current controlled object; and the target location point being located outside the scene picture of the virtual scene.

Figure 19:
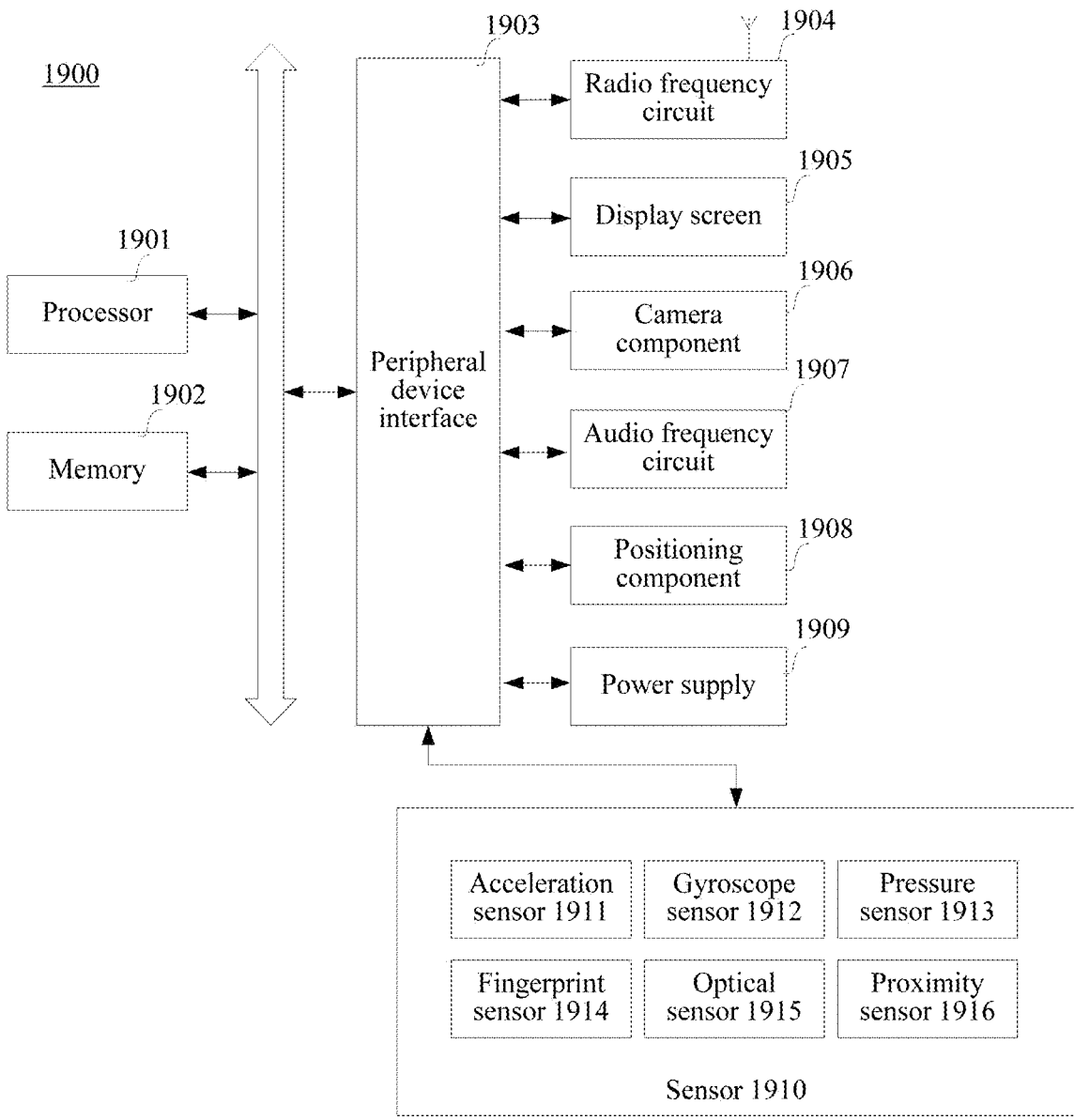
FIG. 19 is a structural block diagram of a computer device according to an exemplary embodiment.

FIG. 19 is a structural block diagram of a computer device 1900 according to an exemplary embodiment. The computer device 1900 may be a user terminal, such as a smartphone, a tablet computer, a moving picture experts group audio layer III (MP3) player, a moving picture experts group audio layer IV (MP4) player, a notebook computer, or a desktop computer. The computer device 1900 may be further referred to as another name such as user equipment, a portable terminal, a laptop terminal, or a desktop terminal.

Generally, the computer device 1900 includes a processor 1901 and a memory 1902.

The processor 1901 may include one or more processing cores, for example, a 4-core processor or an 8-core processor. The processor 1901 may be implemented by at least one hardware form of a digital signal processor (DSP), a field-programmable gate array (FPGA), and a programmable logic array (PLA). The processor 1901 may alternatively include a main processor and a coprocessor. The main processor is configured to process data in an awake state, also referred to as a central processing unit (CPU), and the coprocessor is a low-power consumption processor configured to process data in an idle state. In some embodiments, the processor 1901 may be integrated with a graphics processing unit (GPU). The GPU is responsible for rendering and drawing content to be displayed by a display screen. In some embodiments, the processor 1901 may further include an artificial intelligence (AI) processor. The AI processor is configured to process a calculation operation related to machine learning.

The memory 1902 may include one or more computer-readable storage media. The computer-readable storage media may be non-transient. The memory 1902 may further include a high-speed random access memory, and a non-volatile memory such as one or more magnetic disk storage devices and a flash memory device. In some embodiments, the non-transient computer-readable storage medium in the memory 1902 is configured to store at least one instruction, and the at least one instruction is configured to be executed by the processor 1901 to implement the distance information display method in a virtual scene provided in the method embodiment of this disclosure.

In some embodiments, the computer device 1900 further optionally includes a peripheral device interface 1903 and at least one peripheral device. The processor 1901, the memory 1902, and the peripheral device interface 1903 may be connected through a bus or a signal cable. Each peripheral device may be connected to the peripheral device interface 1903 through a bus, a signal cable, or a circuit board. The peripheral device includes: at least one of a radio frequency (RF) circuit 1904, a touch display screen 1905, a camera component 1906, an audio frequency circuit 1907, a positioning component 1908, and a power source 1909.

The peripheral device interface 1903 may be configured to connect the at least one peripheral device related to input/output (I/O) to the processor 1901 and the memory 1902. In some embodiments, the processor 1901, the memory 1902, and the peripheral device interface 1903 are integrated into the same chip or circuit board. In some other embodiments, any one or two of the processor 1901, the memory 1902, and the peripheral device interface 1903 may be implemented on an independent chip or circuit board, and the implementation is not limited in this embodiment.

The radio frequency circuit 1904 is configured to receive and transmit a radio frequency (RF) signal, also referred to as an electromagnetic signal. The radio frequency circuit 1904 communicates with a communications network and another communications device by using the electromagnetic signal. The radio frequency circuit 1904 may convert an electric signal into an electromagnetic signal for transmission, or convert a received electromagnetic signal into an electric signal. Optionally, the radio frequency circuit 1904 includes an antenna system, an RF transceiver, one or more amplifiers, a tuner, an oscillator, a digital signal processor, a codec chip set, a subscriber identity module card, and the like. The radio frequency circuit 1904 may communicate with another terminal by using a wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the radio frequency circuit 1904 may further include a near field communication (NFC) related circuit, and is not limited in this disclosure.

The display screen 1905 is configured to display a user interface (UI). The UI may include a graph, text, an icon, a video, and any combination thereof. In a case that the display screen 1905 is a touch display screen, the display screen 1905 is further capable of collecting a touch signal on or over a surface of the display screen 1905. The touch signal may be inputted into the processor 1901 as a control signal for processing. In this case, the display screen 1905 may be further configured to provide a virtual button and/or a virtual keyboard, also referred to as a soft button and/or a soft keyboard. In some embodiments, there is one display screen 1905, disposed on a front panel of the computer device 1900. In some other embodiments, there may be at least two display screens 1905, respectively disposed on different surfaces of the computer device 1900 or designed in a foldable shape. In still some other embodiments, the display screen 1905 may be a flexible display screen, disposed on a curved surface or a folded surface of the computer device 1900. Even, the display screen 1905 may be further set to have a non-rectangular irregular graph, that is, a special-shaped screen. The display screen 1905 may be manufactured by using a material such as a liquid crystal display (LCD), an organic light-emitting diode (OLED), or the like.

The camera component 1906 is configured to collect an image or a video. Optionally, the camera component 1906 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1906 may further include a flash. The flash may be a single color temperature flash or a double color temperature flash. The double color temperature flash refers to a combination of a warm flash and a cold flash, and may be configured to perform light ray compensation at different color temperatures.

The audio circuit 1907 may include a microphone and a loudspeaker. The loudspeaker is configured to collect sound waves of a user and an environment, and convert the sound waves into electric signals and input the electrical signals into the processor 1901 for processing, or input the electrical signals into the radio frequency circuit 1904 to implement speech communication. For the purpose of stereo sound collection or noise reduction, there may be a plurality of microphones, respectively disposed at different parts of the computer device 1900. The microphone may be further a microphone array or an omnidirectional collection microphone. The loudspeaker is configured to convert electric signals from the processor 1901 or the radio frequency circuit 1904 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 1907 may further include an earphone jack.

The positioning component 1908 is configured to determine a current geographic location of the computer device 1900 through positioning, to implement navigation or a location based service (LBS). The positioning component 1908 may be a positioning component based on the global positioning system (GPS) of the United States, China's Beidou Navigation Satellite System (BDS), or the Galileo system of Russia.

The power supply 1909 is configured to supply power to components in the computer device 1900. The power supply 1909 may be an alternating current, a direct current, a primary battery, or a rechargeable battery. In a case that the power supply 1909 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the computer device 1900 further includes one or more sensors 1910. The one or more sensors 1910 include, but are not limited to, an acceleration sensor 1911, a gyroscope sensor 1912, a pressure sensor 1913, a fingerprint sensor 1914, an optical sensor 1915, and a proximity sensor 1916.

The acceleration sensor 1911 may detect accelerations on three coordinate axes of a coordinate system established by the computer device 1900. For example, the acceleration sensor 1911 may be configured to detect components of gravity acceleration on the three coordinate axes. The processor 1901 may control, according to a gravity acceleration signal collected by the acceleration sensor 1911, the touch display screen 1905 to display the user interface in a frame view or a portrait view. The acceleration sensor 1911 may be further configured to collect motion data of a game or a user.

The gyroscope sensor 1912 may detect a body direction and a rotation angle of the computer device 1900. The gyroscope sensor 1912 may cooperate with the acceleration sensor 1911 to collect a 3D action by the user on the computer device 1900. The processor 1901 may implement the following functions according to data collected by the gyroscope sensor 1912: motion sensing (for example, the UI is changed according to a tilt operation of the user), image stabilization during shooting, game control, and inertial navigation.

The pressure sensor 1913 may be disposed on a side frame of the computer device 1900 and/or a lower layer of the touch display screen 1905. In a case that the pressure sensor 1913 is disposed on the side frame of the computer device 190, a holding signal of the user on the computer device 1900 may be detected. The processor 1901 performs left and right hand recognition or a quick operation according to the holding signal collected by the pressure sensor 1913. In a case that the pressure sensor 1913 is disposed on the low layer of the touch display screen 1905, the processor 1901 controls, according to a pressure operation of the user on the touch display screen 1905, an operable control on the UI. The operable control includes at least one of a button control, a scroll bar control, an icon control, and a menu control.

The fingerprint sensor 1914 is configured to collect a fingerprint of the user. The processor 1901 identifies an identity of the user according to the fingerprint collected by the fingerprint sensor 1914, or the fingerprint sensor 1914 identifies an identity of the user according to the collected fingerprint. When the identity of the user is identified as a trusted identity, the processor 1901 authorizes the user to perform a related sensitive operation. The sensitive operation includes unlocking a screen, viewing encrypted information, downloading software, payment, changing settings, and the like. The fingerprint sensor 1914 may be disposed on a front face, a back face, or a side face of the computer device 1900. When a physical button or a vendor logo is disposed on the computer device 1900, the fingerprint sensor 1914 may be integrated together with the physical button or the vendor logo.

The optical sensor 1915 is configured to collect ambient light intensity. In an embodiment, the processor 1901 may control display luminance of the touch display screen 1905 according to the ambient light intensity collected by the optical sensor 1915. When the ambient light intensity is relatively high, the display luminance of the touch display screen 1905 is increased. When the ambient light intensity is relatively low, the display luminance of the touch display screen 1905 is reduced. In another embodiment, the processor 1901 may further dynamically adjust shooting parameters of the camera component 1906 according to the ambient light intensity collected by the optical sensor 1915.

The proximity sensor 1916, also referred to as a distance sensor, is usually disposed on the front panel of the computer device 1900. The proximity sensor 1916 is configured to collect a distance between a front face of the user and the front face of the computer device 1900. In an embodiment, when the proximity sensor 1916 detects that the distance between the front face of the user and the front face of the computer device 1900 is gradually decreased, the processor 1901 controls the touch display screen 1905 to switch from a screen-on state to a screen-off state. When the proximity sensor 1916 detects that the distance between the front face of the user and the front face of the computer device 1900 is gradually increased, the processor 1901 controls the touch display screen 1905 to switch from the screen-off state to the screen-on state.

A person skilled in the art may understand that the structure shown in FIG. 19 does not constitute any limitation on the computer device 1900, and the computer device may include more components or fewer components than those shown in the figure, or some components may be combined, or a different component deployment may be used.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps in the method shown in the embodiment corresponding to FIG. 3 or FIG. 6. For example, the non-temporary computer-readable storage medium may be a read-only memory (ROM), a random access memory (RAM), a compact disc ROM (CD-ROM), a magnetic tape, a floppy disk, an optical data storage device, or the like.

After considering the specification and implementing the present disclosure, persons skilled in the art can readily think of other implementations of this disclosure. This disclosure is intended to cover any variations, uses or adaptation of this application following the general principles of this disclosure, and includes the well-known knowledge and conventional technical means in the art and undisclosed in this disclosure. The specification and the embodiments are merely considered as an example, and the actual scope and the spirit of this disclosure are pointed out by the following claims.

It is to be understood that this disclosure is not limited to the accurate structures that are described in the foregoing and that are shown in the accompanying drawings, and modifications and changes may be made without departing from the scope of this disclosure. The scope of this disclosure is limited by the appended claims only.

What is claimed is:

1. A distance information display method in a displayed virtual scene, performed by a terminal, and comprising:
    obtaining location information of a target location point in the virtual scene, wherein the virtual scene includes a three-dimensional environment in which one or more displayed virtual objects and a current controlled object are positioned, the current controlled object representing a user, the target location point comprising a location point at which an indication icon exists in a scene picture of the virtual scene, and the scene picture being a picture of the virtual scene that simulates a view of the three-dimensional environment from a viewpoint of the current controlled object;
    obtaining first distance information according to the location information of the target location point, the first distance information being a first text indicating a distance between the target location point and the current controlled object;
    displaying the first distance information in a first display box that is separate from the indication icon of the target location point in the scene picture of the virtual scene, the indication icon being outside the first display box wherein borders of the first display box surround and are adjacent to the first text and the first distance information is displayed next to the indication icon;
    in response to receiving an operation of unfolding a mini-map, presenting a map interface to display a full map of the virtual scene over the scene picture, the full map presenting a top view of the virtual scene as seen from a viewpoint above the current controlled object;
    providing a map icon in the map interface, the map icon representing a location point in the virtual scene that was set by the user; and
    displaying, in the map interface, second distance information in a second display box, the second distance information including a second text that indicates a distance between the current controlled object and the location point represented by the map icon, the second distance information being displayed next to the map icon, wherein borders of the second display box surround and are adjacent to the second text.

2. The method of claim 1, wherein:
the target location point comprises a location point at which a specified virtual object is located;
the indication icon of the target location point comprises a first icon indicating the specified virtual object; and
the displaying the first distance information comprises:
    displaying the first icon in a straight line direction extending between the specified virtual object and the current controlled object in the scene picture of the virtual scene; and
    displaying the first distance information in a display box next to the first icon.

3. The method of claim 1, wherein:
the target location point comprises a closest boundary point,
the closest boundary point being a location point that is closest to the current controlled object among region boundary points,
the region boundary points being location points on a boundary of a first specified region in the virtual scene, and
the current controlled object being located outside the first specified region;
the indication icon of the target location point comprises a second icon indicating a relative location between the current controlled object and the first specified region; and
the displaying the first distance information comprises:
    displaying the second icon on a boundary of a mini-map in the scene picture of the virtual scene, a location of the second icon on the boundary of the mini-map indicating a direction of the closest boundary point relative to the current controlled object; and
    displaying the first distance information in a display box next to the second icon.

4. The method of claim 1, wherein:
the target location point comprises a marked location point;
the indication icon of the target location point comprises a third icon indicating the marked location point; and
the displaying the first distance information comprises:
    displaying the third icon in an orientation display region in the scene picture of the virtual scene, a location of the third icon in the orientation display region indicating a direction of the marked location point relative to the current controlled object; and
    displaying the first distance information in a display box next to the third icon.

5. The method of claim 1, wherein the displaying the first distance information comprises:
    displaying the first distance information at a specified location around the target location point in a text form in the scene picture of the virtual scene.

6. The method of claim 5, wherein the specified location around the target location point is next to left, right, top, or bottom of the target location point.

7. The method of claim 1, wherein the method further comprises:
    obtaining a target size of the indication icon of the target location point according to the first distance information; and adjusting a size of the indication icon of the target location point to the target size.

8. The method of claim 1, wherein the displaying the first distance information comprises:
in response to a distance display condition being met, displaying the first distance information in a display box next to the indication icon of the target location point in the scene picture of the virtual scene,
the distance display condition comprising at least one of:
the current controlled object being located in a second specified region in the virtual scene,
the distance between the target location point and the current controlled object being greater than a distance threshold,
the target location point being located within a viewing angle range of the current controlled object, or
the target location point being located outside the scene picture of the virtual scene.

9. The method of claim 1, wherein the distance between the target location point and the current controlled object is a linear horizontal distance or a linear three-dimensional spatial distance.

10. The method of claim 1, wherein the method further comprises:
selecting the target location point from location points based on indication icons corresponding to the location points.

11. A terminal, comprising:
a memory operable to store program code; and
a processor operable to read the program code and configured to:
obtain location information of a target location point in a virtual scene, wherein the virtual scene includes a three-dimensional environment in which one or more displayed virtual objects and a current controlled object are positioned, the current controlled object representing a user, the target location point comprising a location point at which an indication icon exists in a scene picture of the virtual scene, and the scene picture being a picture of the virtual scene that simulates a view of the three-dimensional environment from a viewpoint of the current controlled object;
obtain first distance information according to the location information of the target location point, the first distance information being a first text indicating a distance between the target location point and the current controlled object;
display the first distance information in a first display box that is separate from the indication icon of the target location point in the scene picture of the virtual scene, the indication icon being outside the first display box wherein borders of the first display box surround and are adjacent to the first text and the first distance information is displayed next to the indication icon;
in response to receive an operation of unfolding a mini-map, present a map interface to display a full map of the virtual scene over the scene picture, the full map presenting a top view of the virtual scene as seen from a viewpoint above the current controlled object;
provide a map icon in the map interface, the map icon representing a location point in the virtual scene that was set by the user; and
display, in the map interface, second distance information in a second display box, the second distance information including a second text that indicates a distance between the current controlled object and the location point represented by the map icon, the second distance information being displayed next to the map icon, wherein borders of the second display box surround and are adjacent to the second text.

12. The terminal of claim 11, wherein:
the target location point comprises a location point at which a specified virtual object is located;
the indication icon of the target location point comprises a first icon indicating the specified virtual object; and
the processor is configured to:
display the first icon in a straight line direction extending between the specified virtual object and the current controlled object in the scene picture of the virtual scene; and
display the first distance information in a display box next to the first icon.

13. The terminal of claim 11, wherein:
the target location point comprises a closest boundary point,
the closest boundary point being a location point that is closest to the current controlled object among region boundary points,
the region boundary points being location points on a boundary of a first specified region in the virtual scene, and
the current controlled object being located outside the first specified region;
the indication icon of the target location point comprises a second icon indicating a relative location between the current controlled object and the first specified region; and
the processor is configured to:
display the second icon on a boundary of a mini-map in the scene picture of the virtual scene, a location of the second icon on the boundary of the mini-map indicating a direction of the closest boundary point relative to the current controlled object; and
a second information display unit, configured to display the first distance information in a display box next to the second icon.

14. The terminal of claim 11, wherein:
the target location point comprises a marked location point; and
the indication icon of the target location point comprises a third icon indicating the marked location point; and
the processor is configured to:
display the third icon in an orientation display region in the scene picture of the virtual scene, a location of the third icon in the orientation display region indicating a direction of the marked location point relative to the current controlled object; and
display the first distance information in a display box next to the third icon.

15. The terminal of claim 11, wherein the processor is configured to display the first distance information at a specified location around the target location point in a text form in the scene picture of the virtual scene.

16. The terminal of claim 11, wherein the processor is further configured to:
obtain a target size of the indication icon of the target location point according to the first distance information; and
adjust a size of the indication icon of the target location point to the target size.

17. The terminal of claim 11, wherein the processor is configured to:
in response to a distance display condition being met, display the first distance information in a display box next to the indication icon of the target location point in the scene picture of the virtual scene; and
wherein the distance display condition comprises at least one of:
the current controlled object being located in a second specified region in the virtual scene,
the distance between the target location point and the current controlled object being greater than a distance threshold,
the target location point being located within a viewing angle range of the current controlled object, or
the target location point being located outside the scene picture of the virtual scene.

18. A product including:
machine-readable media other than a transitory signal; and
instructions stored on the machine-readable media, the instructions configured to, when executed, cause a machine to:
obtain location information of a target location point in a virtual scene, wherein the virtual scene includes a three-dimensional environment in which one or more displayed virtual objects and a current controlled object are positioned, the current controlled object representing a user, the target location point comprising a location point at which an indication icon exists in a scene picture of the virtual scene, and the scene picture being a picture of the virtual scene that simulates a view of the three-dimensional environment from a viewpoint of the current controlled object;
obtain first distance information according to the location information of the target location point, the first distance information being a first text indicating a distance between the target location point and the current controlled object;
display the first distance information in a first display box that is separate from the indication icon of the target location point in the scene picture of the virtual scene, the indication icon being outside the first display box wherein borders of the first display box surround and are adjacent to the first text and the first distance information is displayed next to the indication icon;
in response to receive an operation of unfolding a mini-map, present a map interface to display a full map of the virtual scene over the scene picture, the full map presenting a top view of the virtual scene as seen from a viewpoint above the current controlled object;
provide a map icon in the map interface, the map icon representing a location point in the virtual scene that was set by the user; and
display, in the map interface, second distance information in a second display box, the second distance information including a second text that indicates a distance between the current controlled object and the location point represented by the map icon, the second distance information being displayed next to the map icon, wherein borders of the second display box surround and are adjacent to the second text.

* * * * *